United States Patent
Kawahara et al.

(10) Patent No.: US 7,894,081 B2
(45) Date of Patent: Feb. 22, 2011

(54) CONFIGURATION RECOGNIZING SYSTEM, CONFIGURATION RECOGNIZING METHOD, AND COMPUTER READABLE MEDIUM STORING CONFIGURATION RECOGNIZING PROGRAM OF DEVICE

(75) Inventors: Jun Kawahara, Kawasaki (JP); Hiroshi Murakami, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1071 days.

(21) Appl. No.: 11/619,814

(22) Filed: Jan. 4, 2007

(65) Prior Publication Data

US 2007/0103725 A1     May 10, 2007

Related U.S. Application Data

(63) Continuation of application No. PCT/JP2004/011082, filed on Aug. 3, 2004.

(51) Int. Cl.
    *G06F 3/12* (2006.01)
    *B41J 3/44* (2006.01)
(52) U.S. Cl. .......................................... 358/1.1; 400/76
(58) Field of Classification Search .................. 358/1.1, 358/1.13, 1.14, 1.15, 498; 347/19; 235/375; 399/24, 10, 12, 31; 400/61, 76, 70; 340/539.1, 340/568.1, 5.29; 700/72, 83, 117
See application file for complete search history.

(56) References Cited

U.S. PATENT DOCUMENTS 6,385,407 B1    5/2002   Inose
2002/0030714 A1*   3/2002   Walker ........................ 347/19
2002/0181015 A1   12/2002   Whale
2002/0191998 A1   12/2002   Cremon et al.
2003/0124445 A1   7/2003   Sugimura et al.
2004/0024501 A1   2/2004   Muehl et al.
2005/0278666 A1*   12/2005   Diamond ...................... 716/4

FOREIGN PATENT DOCUMENTS

| AU | 712509 B2 | 11/1999 |
|---|---|---|
| DE | 100 40 456 A1 | 5/2001 |
| JP | 4-291452 | 10/1992 |
| JP | 7-160768 | 6/1995 |
| JP | 11-272741 | 10/1999 |

(Continued)

OTHER PUBLICATIONS

International Search Report, Mailing Date Sep. 7, 2004 (International Application No. PCT/JP2004/011082).

(Continued)

*Primary Examiner*—Saeid Ebrahimi Dehkordy
(74) *Attorney, Agent, or Firm*—Staas & Halsey LLP

(57) ABSTRACT

The present invention relates to a component mounted to a device and provides a configuration recognizing system, etc. of a device to enable configuration information of the component to be comprehended regardless of electric connection between the component and the device. A configuration recognizing system of a device (electronic device 6, server apparatus 60) with one or a plurality of components (units 41, 42, 43 ... 4N) mounted includes a displaying unit (tag 101, 102, 103 ... 10N) that displays configuration information on the component and a recognizing unit (non-contact recognizing unit 12) that recognize the configuration information from the displaying unit of the component mounted to the inside of the case without contact.

16 Claims, 20 Drawing Sheets

FOREIGN PATENT DOCUMENTS

| | | |
|---|---|---|
| JP | 2000-024269 | 1/2000 |
| JP | 2000-246921 | 9/2000 |
| JP | 2002-94300 | 3/2002 |
| JP | 2003-195690 | 7/2003 |
| JP | 2004-20910 | 1/2004 |
| JP | 2004-53761 | 2/2004 |
| JP | 204-206702 | 7/2004 |
| JP | 2004-192204 | 7/2004 |
| JP | 2004-208893 | 7/2004 |
| WO | 00/21032 | 4/2000 |

OTHER PUBLICATIONS

Japanese Office Action dated Jan. 19, 2010 in corresponding Japanese Patent Application 2006-531057.

Supplementary European Search Report issued on Mar. 19, 2009 in corresponding European Search Report 04748214.6.

European Office Action issued Jul. 7, 2009 in corresponding European Application No. 04748214.6-2221.

International Preliminary Report on Patentability, mailed May 3, 2007 and issued in corresponding International Patent Application No. PCT/JP2004/011082.

* cited by examiner

CONFIGURATION RECOGNIZING SYSTEM, CONFIGURATION RECOGNIZING METHOD, AND COMPUTER READABLE MEDIUM STORING CONFIGURATION RECOGNIZING PROGRAM OF DEVICE

CROSS-REFERENCE TO RELATED APPLICATIONS

This application is a continuation of International Application No. PCT/JP2004/011082, filed on Aug. 3, 2004, now pending, herein incorporated by reference.

BACKGROUND OF THE INVENTION

1. Field of the Invention

The present invention relates to a configuration recognizing system, configuration recognizing method, and a configuration recognizing program for recognizing a component such as a unit mounted to various devices such as server systems on the device side without intervention of electric connections.

2. Description of the Related Art

Although units such as CPUs and memories are mounted to various server systems such as a communication server, database server, and file server, each unit includes unique information such as a unit ID and the unique information is displayed with a pattern embedded in a unit substrate. When each unit is mounted to a case and electric connection is established, the unique information thereof is recognized by a system control mechanism (firmware). If the unit substrates increase and exceed the initial expectation at the time of manufacturing, the unit ID set for each unit must be changed and the unit substrates may be forced to be altered correspondingly.

Since the memory capacity of the unit often cannot be recognized unless supplying electric power (powering on) to the system substrate and the determination cannot be made for the memory configuration violation and the number of licenses corresponding to the memory configuration before supplying electric power, the maintenance and replacement operations are troublesome.

With regard to the management of the component such as a unit in various devices, prior patent documents are listed as follows.

Patent Document 1: Japanese Patent Application Laid-Open Publication No. 1999-272741

Patent Document 2: Japanese Patent Application Laid-Open Publication No. 1992-291452

Patent Document 3: Japanese Patent Application Laid-Open Publication No. 1995-160768

Patent Document 4: Japanese Patent Application Laid-Open Publication No. 2002-94300

The patent Document 1 (Japanese Patent Application Laid-Open Publication No. 1999-272741) discloses a print substrate managing method for performing batch management of data of a manufacturing process with a center apparatus and, in this management method, the batch management of process information such as adjustment data and repair data is performed for each substrate. Since the adjustment data and management data of the print substrate built into the apparatus has been managed in each process of the manufacturing process, such as a substrate adjustment process, an assembly process, and a general process or in a manufacturing department, this merely increases availability of data by performing the batch management of the manufacturing process data with the center apparatus. That is, the mounting apparatus does not recognize the substrate mounted thereto.

The patent document 2 (Japanese Patent Application Laid-Open Publication No. 1992-291452) discloses a product configuration management system that assists an analysis of a failure generated after product shipment with barcode labels attached to components of the product. By adding serial numbers to the components of the product with the barcode labels to register in a database of the components the correlation, etc. between the serial numbers and the components and the delivery destination of the product, it is merely attempted to check a failure history only by reading the barcodes of the components and to utilize the history in a failure diagnosis. That is, the components are not recognized by the device to which the components are mounted.

The Patent document 3 (Japanese Patent Application Laid-Open Publication No. 1995-160768) merely discloses a product history management system for using an appropriate part in a mounting work and an on-site maintenance operation of an electronic automatic exchange. This management system merely manages information through barcodes to eliminate an information difference generated between the site and the manufacturer.

The patent document 4 (Japanese Patent Application Laid-Open Publication No. 2002-94300) discloses a lot management system and controlling method thereof, etc. The system and method merely collect lot number information added to each part configuring a unit through character recognition and store lot numbers and part information, etc., corresponding to the lot numbers, which is provided from the manufacturer, to perform quality management in conjunction with the quality information, etc. corresponding to the lot numbers. The system and method do not allow a device to recognize a component mounted to the device to perform a process corresponding to the component.

SUMMARY OF THE INVENTION

The present invention relates to a component mounted to a device and an object of the present invention is to enable configuration information of the component to be comprehended regardless of electric connection between the component and the device.

Another object of the present invention is to enable the configuration information to be comprehended without contact from the component mounted to the device and to utilize the configuration information.

To achieve the above objects, a configuration recognizing system of a device of the present invention is a configuration recognizing system of a device with one or a plurality of components mounted, and the system includes a displaying unit that displays configuration information on the component; and a recognizing unit that recognize the configuration information from the displaying unit of the component mounted to the inside of the case without contact.

In this configuration, the configuration information relating to one or a plurality of components mounted to the device can be recognized from the displaying unit attached to the component to comprehend the component without contact. The configuration information is comprehended in the relationship between the displaying unit and the recognizing unit regardless of power supply to the component or electric connection with the device. The configuration information is information relating to the component and includes information representing details of the component, identification information, mounting information representing a relationship with the mounting device, etc.

To achieve the above objects, the configuration recognizing system of the device of the present invention may include a controlling unit that uses the configuration information recognized by the recognizing unit to determine whether the component is normal and that outputs the determination information. In this configuration, the configuration information is recognized from the displaying unit attached to the component without contact and can be used to know whether the component is normal without supplying power to the component.

To achieve the above objects, the configuration recognizing system of the device of the present invention may include a controlling unit that determines whether another recommended component exists from the configuration information recognized by the recognizing unit and that outputs the determination information. In this configuration, the configuration information recognized from the displaying unit can be used to know whether the component is suitable regardless of power supply, which can contribute to the mounting of the optimum component.

To achieve the above objects, the configuration recognizing system of the device of the present invention may include a monitoring unit that monitors the component based on the configuration information recognized by the recognizing unit. In this configuration, the configuration information recognized through the recognizing unit can be transferred to the monitoring unit to monitor the configuration information with the monitoring unit.

To achieve the above objects, the configuration recognizing system of the device of the present invention may include a database that stores the configuration information. In this configuration, by registering the configuration information relating to the component mounted to the device in the database along with the component, the stored information can be used as determination information for determining whether the component is normal and whether another recommended component exists.

To achieve the above objects, in the configuration recognizing system of the device of the present invention, the displaying unit may be a tag attached to the component. In this configuration, if the displaying unit includes the tag that displays the configuration information on each component, the component can be managed through the configuration information displayed on the tag without writing the configuration information into a ROM (Read-Only Memory), etc. on each component.

To achieve the above objects, in the configuration recognizing system of the device of the present invention, the displaying unit displaying the configuration information may be an image recognition label, IC tag, barcode label, or magnetic stripe label, etc. If the displaying unit includes the image recognition label, the displayed configuration information can be recognized through an image to read the configuration information from the image. If the displaying unit includes the IC tag, the configuration information transmitted from the IC tag can be received through radio waves to detect the configuration information from the received radio waves. If the displaying unit includes the barcode label, the configuration information displayed by the barcode can be read. If the displaying unit includes the magnetic stripe label, the configuration information recorded in the magnetic stripe can be recognized and read.

To achieve the above objects, in the configuration recognizing system of the device of the present invention, the configuration information may include identification information of the component, content information of the component, and mounting information of the component for the device.

To achieve the above objects, in the configuration recognizing system of the device of the present invention, the recognizing unit may be an imaging unit that images the displaying unit. In the configuration with the imaging unit, by imaging the image recognition label or the barcode label, the configuration information displayed on the image recognition label or the barcode label can be recognized and read.

To achieve the above objects, in the configuration recognizing system of the device of the present invention, the displaying unit may include an IC tag that transmits the configuration information and the recognizing unit may be a tag reader that recognizes the configuration information from the IC tag. If the recognizing unit includes the tag reader that reads the IC tag, the radio waves transmitted from the IC tag can be received by the tag reader to detect the configuration information from the radio waves.

To achieve the above objects, in the configuration recognizing system of the device of the present invention, the displaying unit may include a barcode that displays the configuration information and the recognizing unit may be a barcode reader that recognizes the barcode to read the configuration information. If the recognizing unit includes the barcode reader, the configuration information can be read from the barcode.

To achieve the above objects, in the configuration recognizing system of the device of the present invention, the displaying unit may include a magnetic stripe that magnetically records the configuration information and the recognizing unit may be a stripe reader that recognizes the magnetic stripe to read the configuration information. If the recognizing unit includes the stripe reader, the configuration information recorded in the magnetic stripe can be recognized and read.

To achieve the above objects, a configuration recognizing method of a device of the present invention is a configuration recognizing method of a device with one or a plurality of components mounted, and the method includes the steps of recognizing a displaying unit that displays configuration information of the component to read the configuration information without contact and determining whether the configuration information is normal. In this configuration, the configuration information relating to one or a plurality of components mounted to the device can be recognized from the displaying unit attached to the component to comprehend the component without contact. The configuration information is comprehended in the relationship between the displaying unit and the recognizing unit regardless of power supply to the component or electric connection with the device.

To achieve the above objects, a configuration recognizing method of a device of the present invention is a configuration recognizing method of a device with one or a plurality of components mounted, and the method may include the steps of recognizing a displaying unit that displays configuration information of the component to read the configuration information without contact and determining whether another recommended component exists from the configuration information. In this configuration, the suitable component can be selected.

To achieve the above objects, a configuration recognizing program of a device of the present invention is a configuration recognizing program of a device with one or a plurality of components mounted, and the program allows an information processing apparatus mounted to the device to perform a process including the steps of recognizing a displaying unit that displays configuration information of the component to read the configuration information without contact and determining whether the configuration information is normal.

To achieve the above objects, a configuration recognizing program of a device of the present invention is a configuration recognizing program of a device with one or a plurality of components mounted, and the program may allow an information processing apparatus mounted to the device to perform a process including the steps of recognizing a displaying unit that displays configuration information of the component to read the configuration information without contact; determining whether the configuration information is normal; and determining whether another recommended component exists from the configuration information.

To achieve the above objects, the configuration recognizing program of the device of the present invention may include the step of making a database of the configuration information. Therefore, the database can be made for the configuration information representing the component mounted to the device and the mounting thereof and the information can be used to determine whether the component is normal and whether another recommended component exist or can be utilized as maintenance information.

As described above, the present invention relates to a component mounted to a device and enables configuration information to be comprehended regardless of electric connection between the component and the device without contact with the component.

According to the present invention, the comprehended configuration information can be utilized for management of the component, such as determining whether the component is suitable and selecting the recommended component. For example, the alteration due to increase in the substrate information such as IDs of the components can be suppressed to achieve cost reduction and, since the configuration information can be comprehended without the need for electric connection with the component or power supply, this can make the configuration information acquired easier and improve the efficiency of the maintenance work.

A database is made for the configuration information after change in the configuration such as replacement of the component, which contributes to the elaborate component management.

Other objects, features, and advantages of the present invention will become more apparent by reference to the accompanying drawings and the embodiments.

DETAILED DESCRIPTION OF THE PREFERRED EMBODIMENTS

First Embodiment

Figure 1:
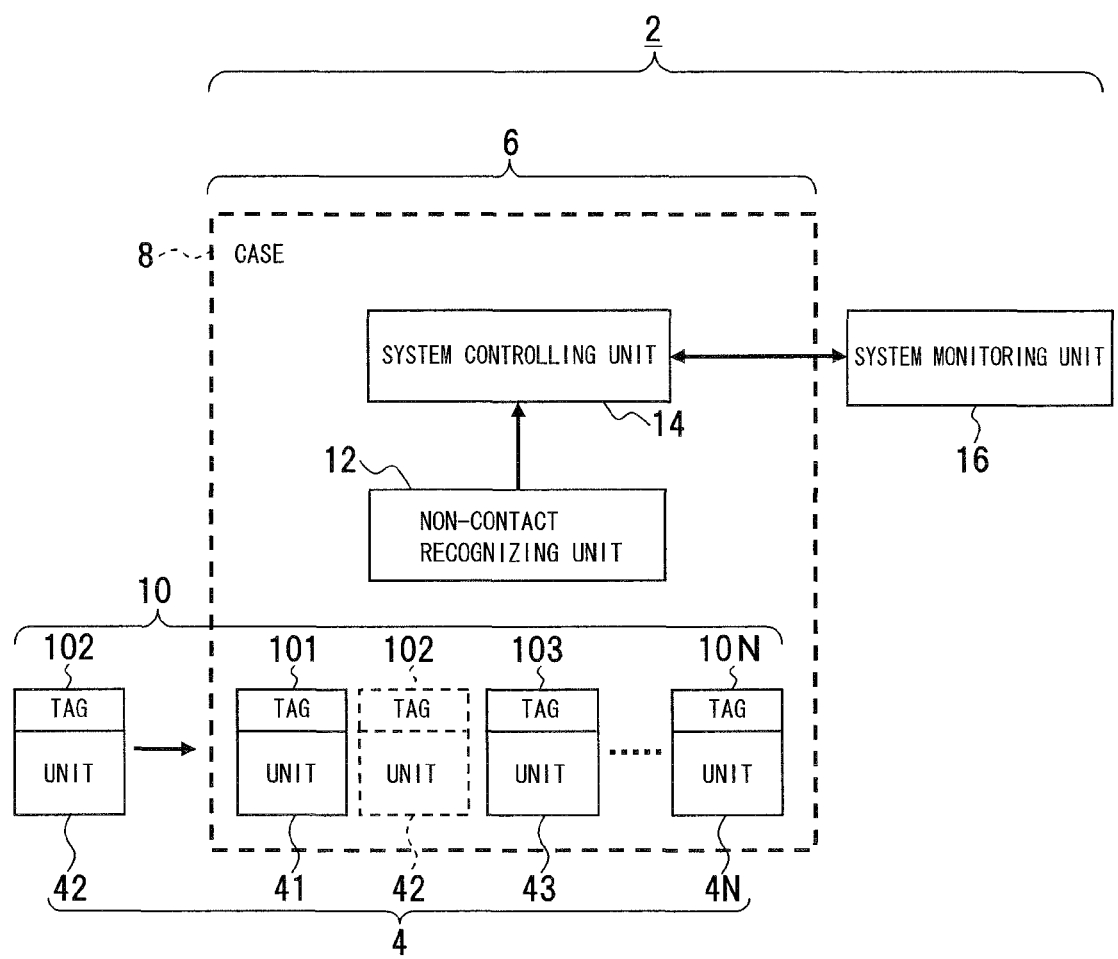
FIG. 1 is a block diagram of a configuration recognizing system for an electronic device (first embodiment).

A first embodiment of the present invention, i.e., a configuration recognizing system for an electronic device will be described with reference to FIG. 1. FIG. 1 is a block diagram of an outline of a configuration recognizing system for an electronic device.

This configuration recognizing system 2 establishes automated recognition of a component 4 without intervention of electric connection. The configuration recognizing system 2 according to this embodiment is directed to an electronic device 6 such as a server apparatus; inside a case 8 of the electronic device 6, the component 4 is included which is a plurality of replaceable units 41, 42, 43 . . . 4N such as a substrate unit, CPU (Central Processing Unit), and memory, for example; and the units 41, 42, 43 . . . 4N are disposed with a plurality of tags 101, 102, 103 . . . 10N, which are a tag 10 configuring a displaying unit that individually displays configuration information. Each tag 101, 102, 103 . . . 10N displays configuration information representing configuration contents for each unit 41, 42, 43 . . . 4N and the tags 101, 102, 103 . . . 10N include barcode labels, IC (Integrated Circuit) tags, magnetic stripe labels, image recognition labels, etc. The configuration information displayed on the tags 101, 102, 103 . . . 10N is one or more pieces of information selected from distinction information, characteristic values, editions, versions, manufacturers, model numbers, serial numbers, applications, maintenance information, etc., for making distinction of units 41, 42, 43 . . . 4N. For example, if the unit 42 is a CPU unit, the identification information is a serial number, unit ID, specification, manufacture name, etc., and the specification is a cache capacity, number of ways, and memory capacity, for example.

The unit 42 outside the case 8 is mounted to the inside of the case 8 or replaces any one of the units 41, 42, 43 . . . 4N in the case 8.

The case 8 is disposed with a non-contact recognizing unit 12 that recognizes the tags 101, 102, 103 . . . 10N without contact and the non-contact recognizing unit 12 recognizes the tags 101, 102, 103 . . . 10N and reads configuration information from the tags 101, 102, 103 . . . 10N. The information read from the tags 101, 102, 103 . . . 10N is added to a system controlling unit 14 from the non-contact recognizing unit 12 and the identification information is used to identify the units 41, 42, 43 . . . 4N and a control process based on the identification.

The system controlling unit 14 is an information processing apparatus including a computer, etc., and includes, for example, firmware serving as system controlling software, and the firmware includes management information that links the mounting positions of the units 41, 42, 43 . . . 4N with the specification information of the units 41, 42, 43 . . . 4N.

In this embodiment, a system monitoring unit 16 is disposed outside of the case 8 and is connected to a system controlling unit 14, and the system monitoring unit 16 is notified of the recognition information of the non-contact recognizing unit 12 from the system controlling unit 14. Therefore, the system monitoring unit 16 can monitor characteristics of one or more units 41, 42, 43 . . . 4N mounted or replaced and whether control corresponding to the characteristics is performed, etc. The system monitoring unit 16 can include an information processing apparatus such as a personal computer.

According to the configuration, if the units 41, 42, 43 . . . 4N are mounted to the inside of the case 8, the tags 101, 102, 103 . . . 10N of the units 41, 42, 43 . . . 4N are recognized regardless of the connection between the system controlling unit 14 of the electronic device 6 and the units 41, 42, 43 . . . 4N, which configures a system of the electronic device, and the identification information can be read from the tags 101, 102, 103 . . . 10N to allow the system controlling unit 14 to recognize the mounting information of the units 41, 42, 43 . . . 4N. Therefore, since the system may not be started after connecting the system controlling unit 14 and the units 41, 42, 43 . . . 4N to know details of the units 41, 42, 43 . . . 4N, the maintenance and replacement operations can be quickly performed, and control can be realized which utilizes the recognition information of the recognized units 41, 42, 43 . . . 4N.

Second Embodiment

Figure 2:
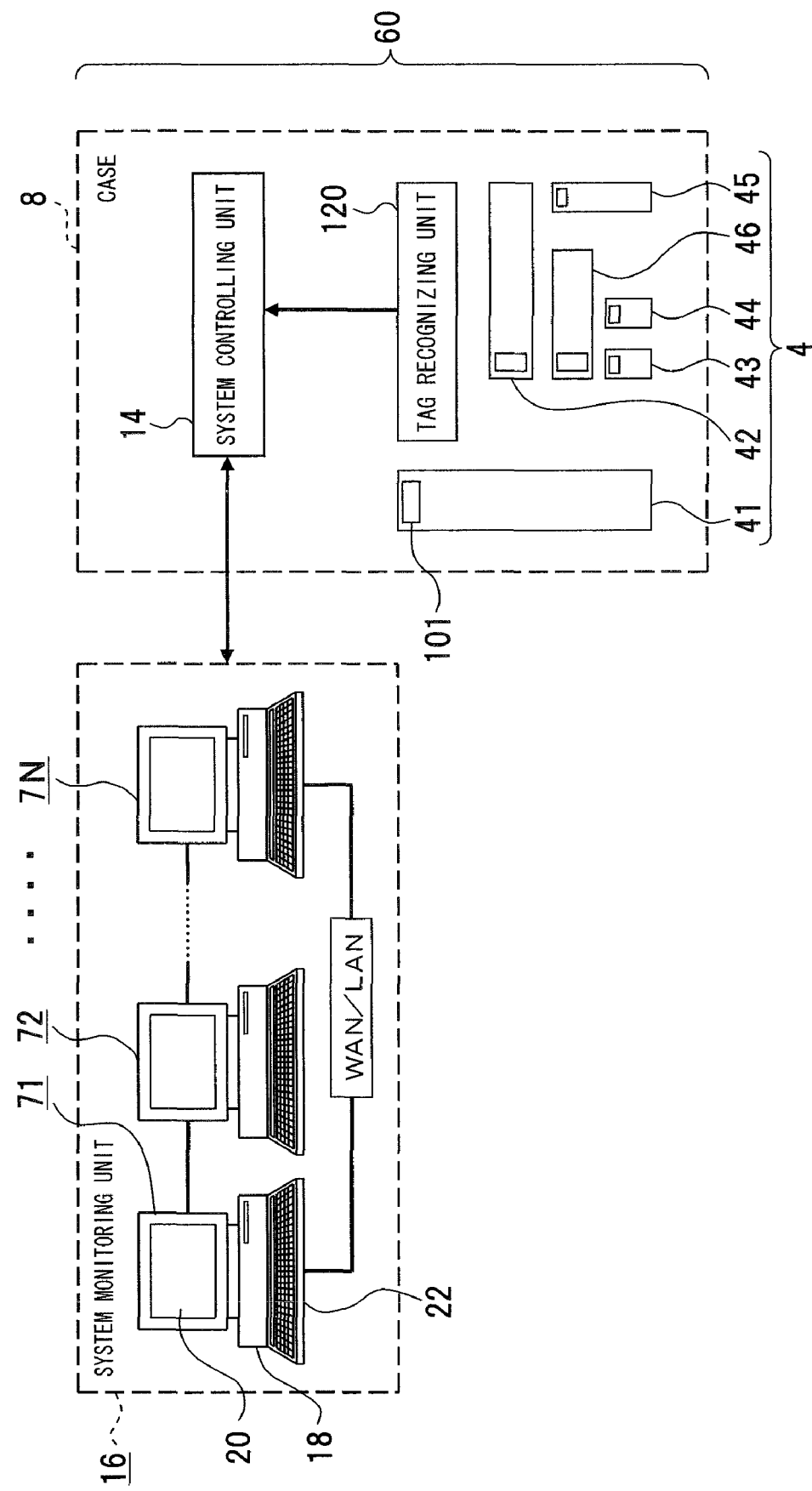
FIG. 2 is a block diagram of a configuration recognizing system for a server apparatus (second embodiment).

A second embodiment of the present invention, i.e., a configuration recognizing system for a server apparatus will be described with reference to FIG. 2. FIG. 2 is a block diagram of an outline of a configuration recognizing system for a server apparatus. The same reference numerals are added to the same portions as the first embodiment.

In the configuration recognizing system 2 of the embodiment, a server apparatus 60 is disposed as a target device of configuration recognition and the server apparatus 60 corresponds to the electronic device 6 (FIG. 1) of the first embodiment. A case 8 of the server apparatus 60 includes a plurality of replaceable units 41, 42, 43 . . . 4N as the component 4. The units 41, 42, 43 . . . 4N are control substrates, memories, etc. The above tags 101, 102, 103 . . . 10N are attached to the units 41, 42, 43 . . . 4N. As described above, the barcode labels, IC (Integrated Circuit) tags, magnetic stripe labels, image recognition labels, etc., may be used for the tags 101, 102, 103 . . . 10N, which display the above configuration information.

A tag recognizing unit 120 serving as the non-contact recognizing unit is disposed in the case 8 of the server apparatus 60 along with the system controlling unit 14. The tag recognizing unit 120 recognizes the tags 101, 102, 103 . . . 10N and reads the display information, which is transferred to the system controlling unit 14. If the units 41, 42, 43 . . . 4N are mounted or replaced in the case 8, the mounting positions and the specification information of the units 41, 42, 43 . . . 4N are linked and the system controlling unit 14 stores management information for comprehensively managing the mounting positions, each specification information, etc.

The system monitoring unit 16 connected to the system controlling unit 14 includes, for example, a plurality of personal computers (PC) 71, 72 . . . 7N serving as system monitoring terminals, and the PCs 71, 72 . . . 7N configure a wide area network (WAN) or local area network (LAN) and monitor the configuration of the server apparatus 60. Each PC 71, 72 . . . 7N serving as the system monitoring terminals includes an information processing unit 18, a displaying unit 20, and an input unit, for example, a keyboard 22. The configuration information transmitted from the tag recognizing unit 120 can be displayed on the displaying units 20 of the PCs 71, 72 . . . 7N of the system monitoring unit 16. The system monitoring units 16 may include workstations serving as the system monitoring terminals.

Figure 3:
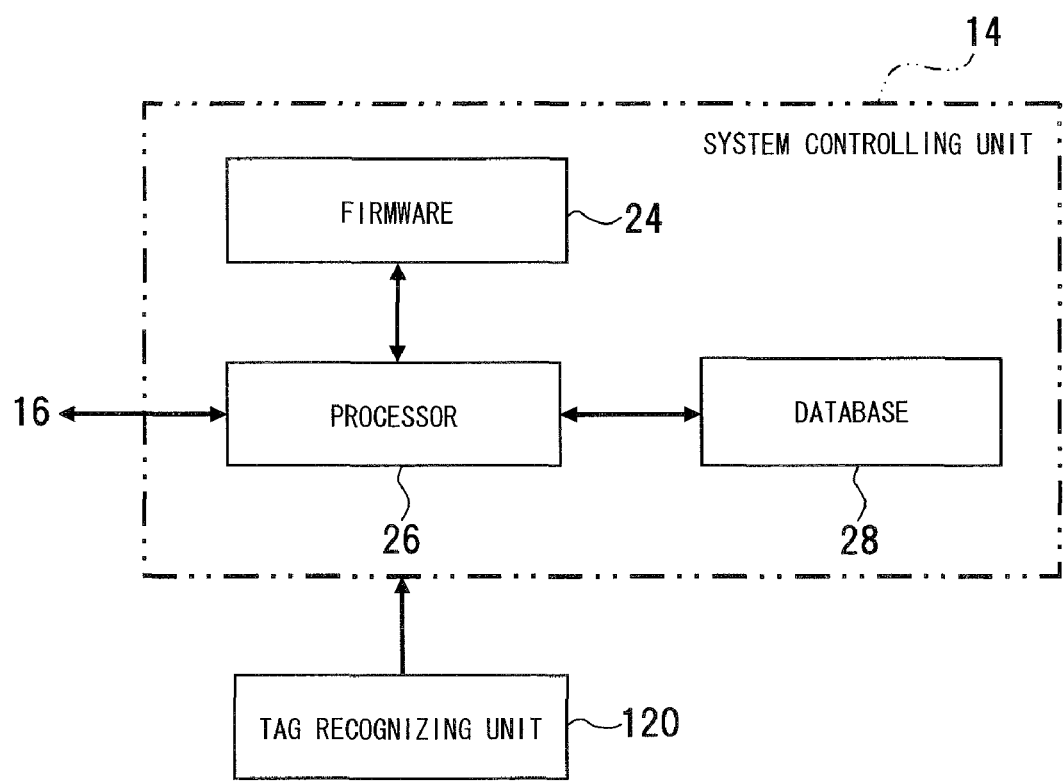
FIG. 3 is a block diagram of a configuration example of a system controlling unit.

In this case, for example, as shown in FIG. 3, the system controlling unit 14 may include firmware 24 for system control, a processor 26 executing the firmware 24, and a database 28 storing the configuration information. In this configuration, the firmware 24 configures a table that stores the configuration positions and specification information of the units 41, 42, 43 . . . 4N in the database 28, and this table can be used to register and manage the configuration information in the database 28 and to automatically display the recognition information of the tag recognizing unit 120 through the processor 26 on any one or all of the PCs 71, 72 . . . 7N that are the system monitoring terminals of the system monitoring unit 16. Therefore, the mounted or replaced units 41, 42, 43 . . . 4N in the case 8 of the server apparatus 60 can be monitored through the display.

Third Embodiment

Figure 4:
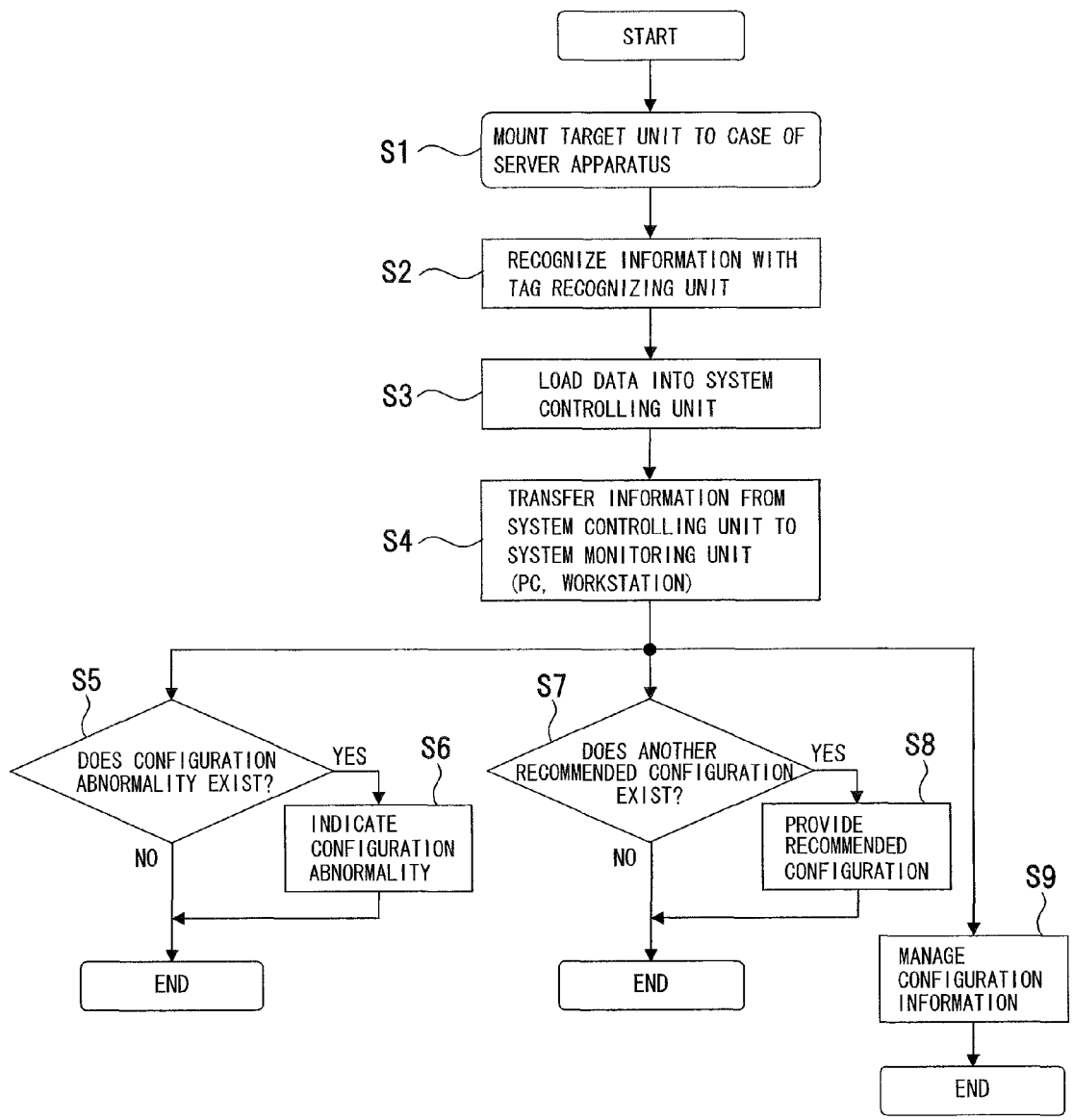
FIG. 4 is a flowchart of a configuration recognizing method and a configuration recognizing program for a server apparatus (third embodiment).

A third embodiment of the present invention, i.e., a configuration recognizing method and recognizing program for a device will be described with reference to FIG. 4. FIG. 4 is a flowchart of a process of each procedure of the configuration recognizing method and each step of the configuration recognizing program in the configuration recognizing system of a server apparatus.

The tags 101, 102, 103 . . . 10N are independently added to the units 41, 42, 43 . . . 4N mounted to the server apparatus 60. That is, the tags 101, 102, 103 . . . 10N represent the distinction information, characteristic values, editions, versions, manufacturers, model numbers, serial numbers, applications, maintenance information, etc., of the units 41, 42, 43 . . . 4N.

The mounting or replacement target units 41, 42, 43 . . . 4N are mounted to the case 8 of the server apparatus 60 (step S1) the tag recognizing unit 120 recognizes the tags 101, 102, 103 . . . 10N of the mounted units 41, 42, 43 . . . 4N (step S2); and the recognized configuration information is loaded into the system controlling unit 14 by executing an information loading process in the system controlling unit 14 (step S3). For example, if the unit 41 is mounted, the tag 101 is recognized and the unit 41 is identified based on the information displayed on the tag 101.

The system controlling unit 14 transfers the loaded information to the system monitoring unit 16 (step S4) and the recognition information is added to the PC 71, 72 . . . 7N. When the above unit 41 is mounted, the information displayed on the tag 101 of the unit 41 is displayed on the displaying unit 20.

The system controlling unit 14 determines whether the mounted unit 41, 42, 43 . . . 4N has a configuration abnormality (step S5); if a configuration abnormality does not exist, the configuration abnormality determination process is terminated; if a configuration abnormality exists, the configuration abnormality is indicated (step S6); and the system monitoring unit 16 is notified of the display information, which is displayed.

The system controlling unit 14 determines whether another unit 41, 42, 43 . . . 4N exists for another recommended configuration of the mounted unit 41, 42, 43 . . . 4N (step S7); if the recommended configuration does not exist, the recommended configuration determination process is terminated; if the recommended configuration exists, notification of the recommended configuration is performed (step S8); and the system monitoring unit 16 is notified of the display information, which is displayed. A user can know the unit 41, 42, 43 . . . 4N serving as the optimum configuration from the display.

The system controlling unit 14 acquires each configuration information from the tags 101, 102, 103 . . . 10N attached to the mounted units 41, 42, 43 . . . 4N and, for example, links the mounting positions and the specification information for registration and management in the database 28 (FIG. 3) (step S9).

In such a configuration recognizing method or configuration recognizing program, whether the target unit 41, 42, 43 . . . 4N is mounted can be known and displayed on the display unit 20 of the system monitoring unit 16 along with the details of the unit without supplying power (powering on). In this case, the system controlling unit 14 can perform the configuration abnormality determination for the units 41, 42, 43 . . . 4N and can notify the system monitoring unit 16 of the abnormality without supplying power (powering on).

In the management of the configuration information, with regard to the number of licenses of the targets units 41, 42, 43 . . . 4N, the system controlling unit 14 can determine the number of licenses and the system monitoring unit 16 can be notified of the number without supplying power (powering on).

Figure 5:
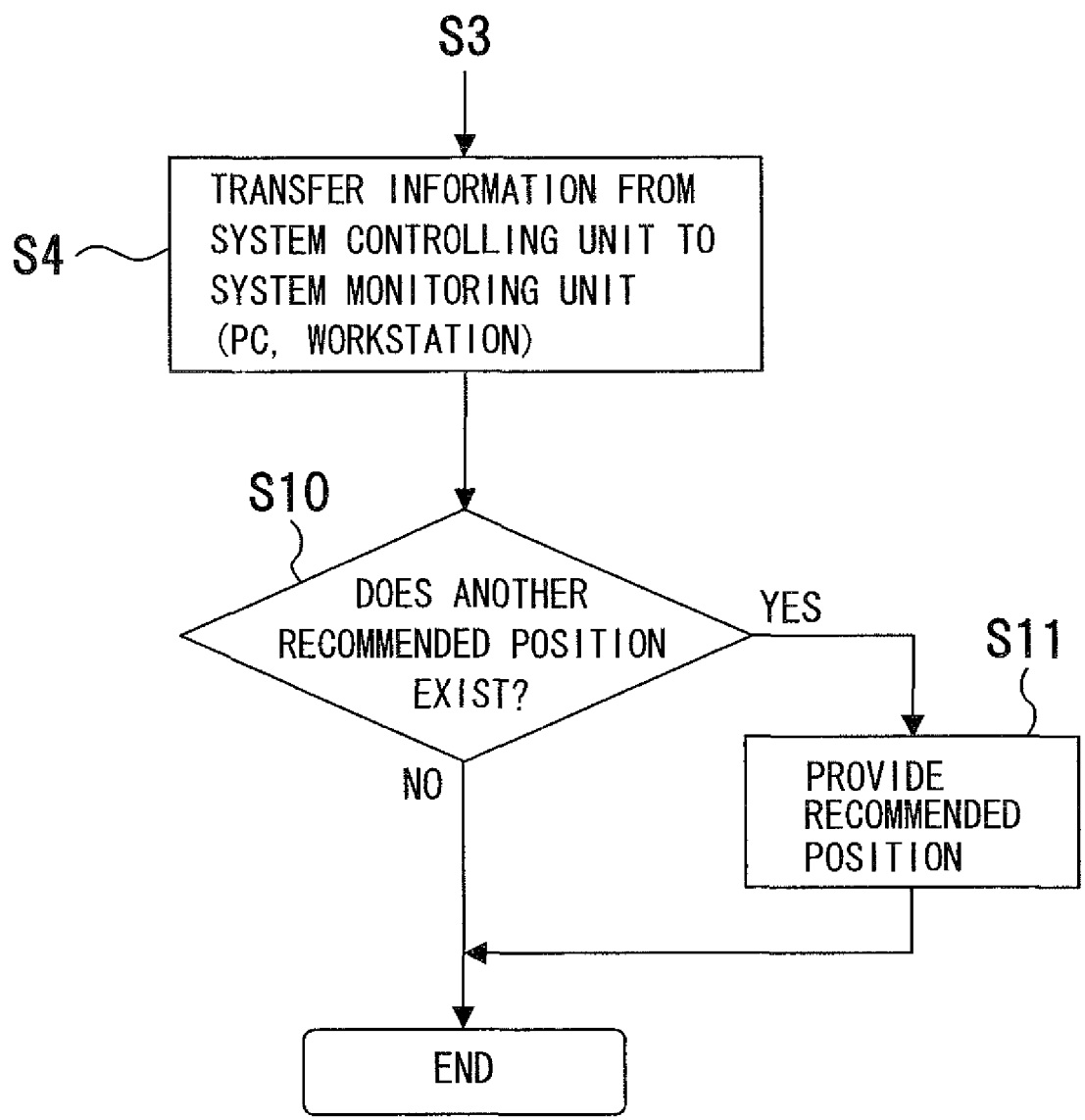
FIG. 5 is a flowchart of a variation of the configuration recognizing method and the configuration recognizing program for the server apparatus.

For example, as shown in FIG. 5, after the system controlling unit 14 transfers the information to the system monitoring unit 16 (step S4), the mounting position of each mounted unit 41, 42, 43 . . . 4N is determined whether another recommended position exists (step S10) and if the recommended position exists, the system monitoring unit 16 is notified of the position (step S1). In this configuration, the recommended position can easily be determined for notification along with the recommended configuration, and the unit 41, 42, 43 . . . 4N with a configuration abnormality can be normalized by changing the recommended position.

Fourth Embodiment

Figure 6:
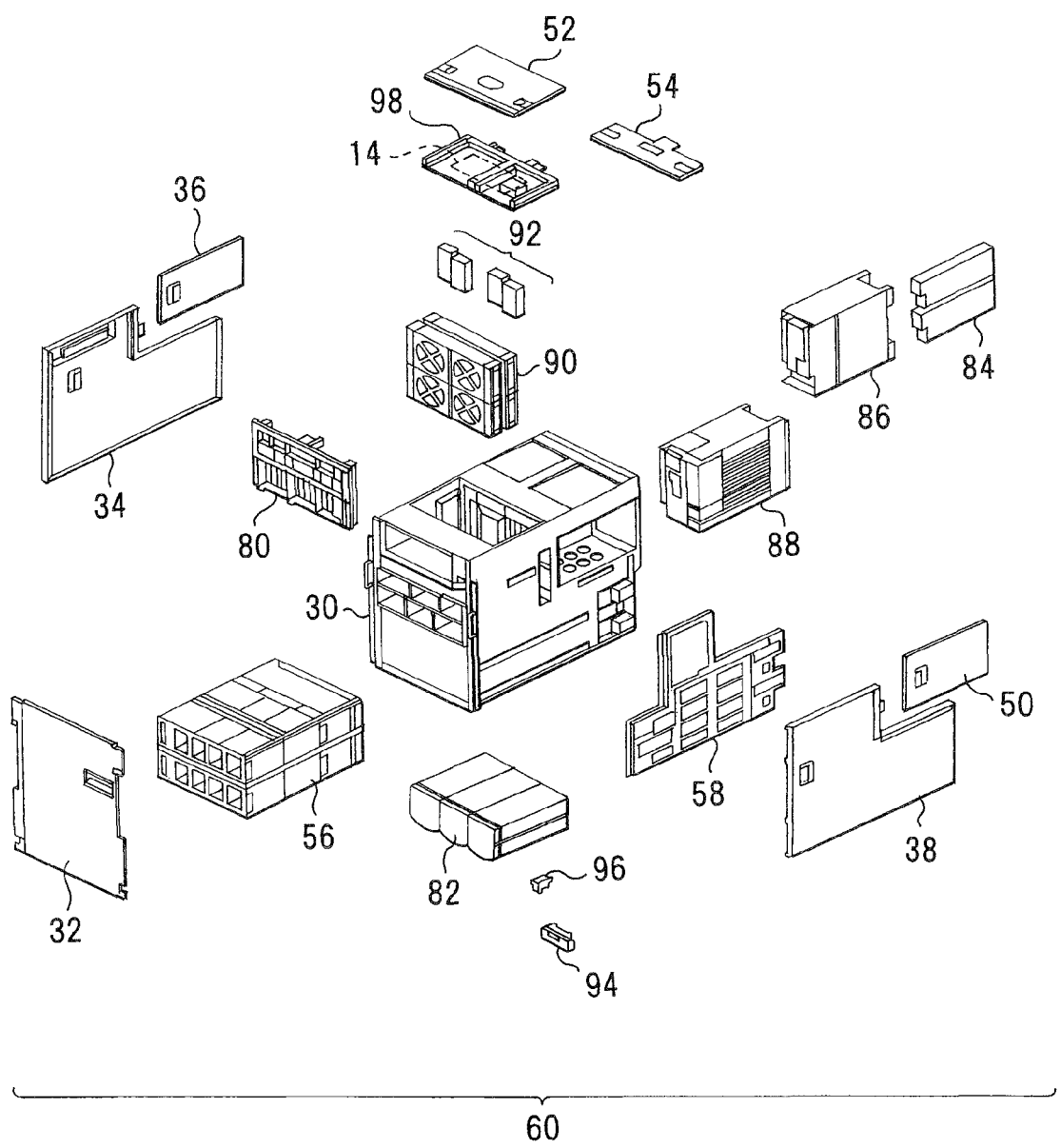
FIG. 6 is an exploded perspective view of a server apparatus broken down into constituent units (fourth embodiment).
Figure 7:
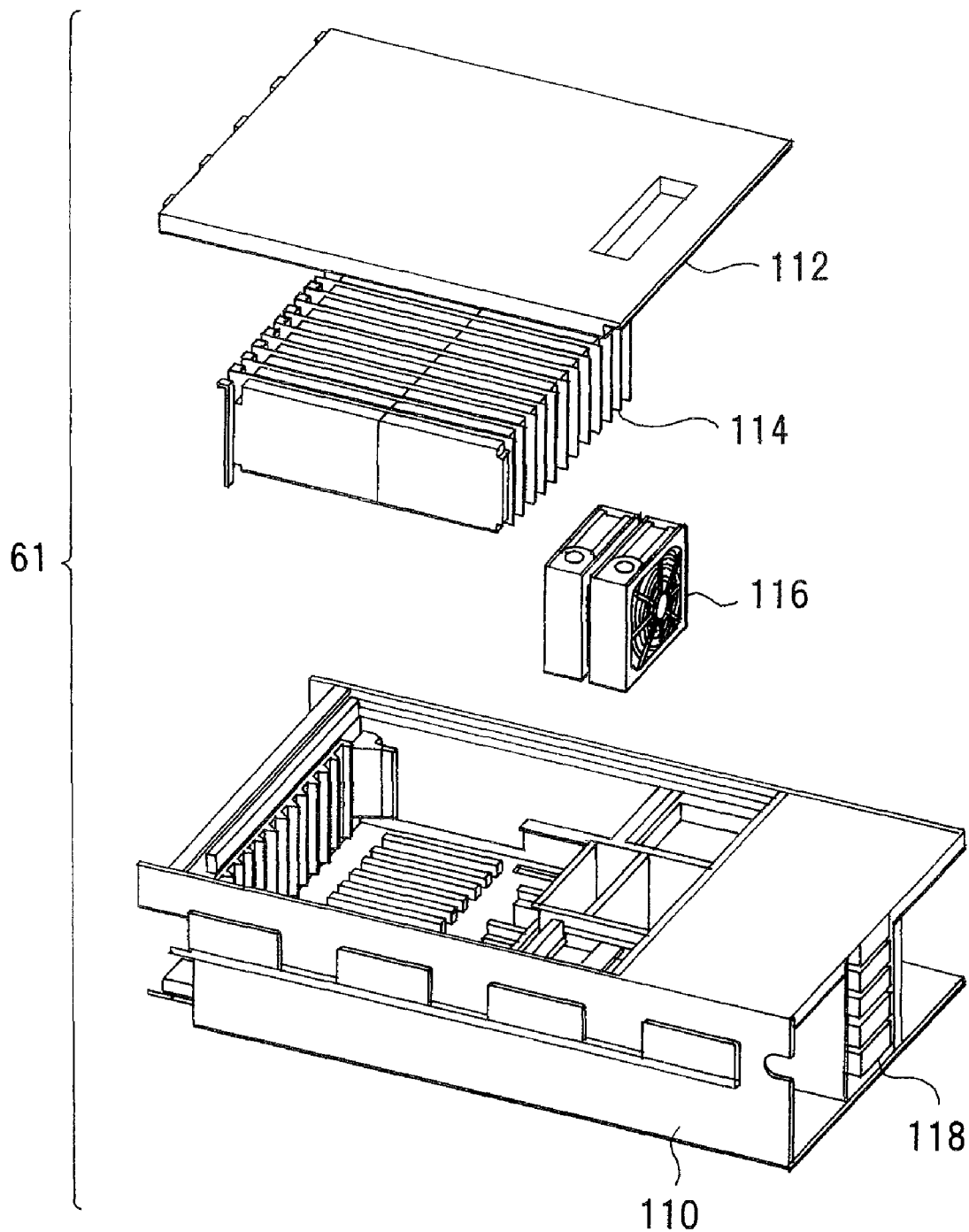
FIG. 7 is an exploded perspective view of an example of an I/O interface unit (fourth embodiment).

Constituent units of a server apparatus will be described with reference to FIGS. 6 and 7. FIG. 6 shows an example of a server apparatus broken down into units and FIG. 7 shows an example of an I/O interface unit.

This server apparatus 60 includes a chassis 30 configuring the above case 8, a front cover 32 attached to the front side of the chassis 30, a left side cover 34 and left side sub-cover 36 attached to the left side thereof, a right side cover 38 and right side sub-cover 50 attached to the right side thereof, an upper external cover 52 disposed on the upper surface thereof, an upper internal cover 54, etc.

The chassis 30 is disposed with a plurality of units 41, 42, 43 . . . 4N, for example, a motherboard 56, back panels 58, 80, power supply units 82, 84, I/O units 86, 88, fan trays 90, 92, a power button 94, a counter unit 96, etc., and the motherboard 56 is equipped with a system substrate 98 configuring the system controlling unit 14.

The above tags 101, 102, 103 . . . 10N (FIGS. 1 and 2) displaying specific information are added to the components that can be mounted and replaced, except the system substrate 98.

As shown in FIG. 7, for example, an I/O interface unit 61 is an I/O unit added to the server apparatus 60 and includes a case 110 and an upper cover 112, and the case 110 is equipped with a unit 114 of a PCI card and a basic LAN card (LAN board) a fan unit 116, a disk unit 118, etc.

Even the I/O apparatus serving as a component added to the server apparatus 60 is configured as the above units 41, 42, 43 . . . 4N and the tags 101, 102, 103 . . . 10N (FIGS. 1 and 2) are added as above.

In this configuration, with regard to the server apparatus 60 and the additional configuration, the above tag recognizing unit 120 can recognize the tags 101, 102, 103 . . . 10N and read the displayed information to utilize the configuration information as the management information and can perform determination of the configuration abnormality, determination of the recommended configuration, and determination of the recommended position as well as management of the configuration information.

Fifth Embodiment

Figure 8:
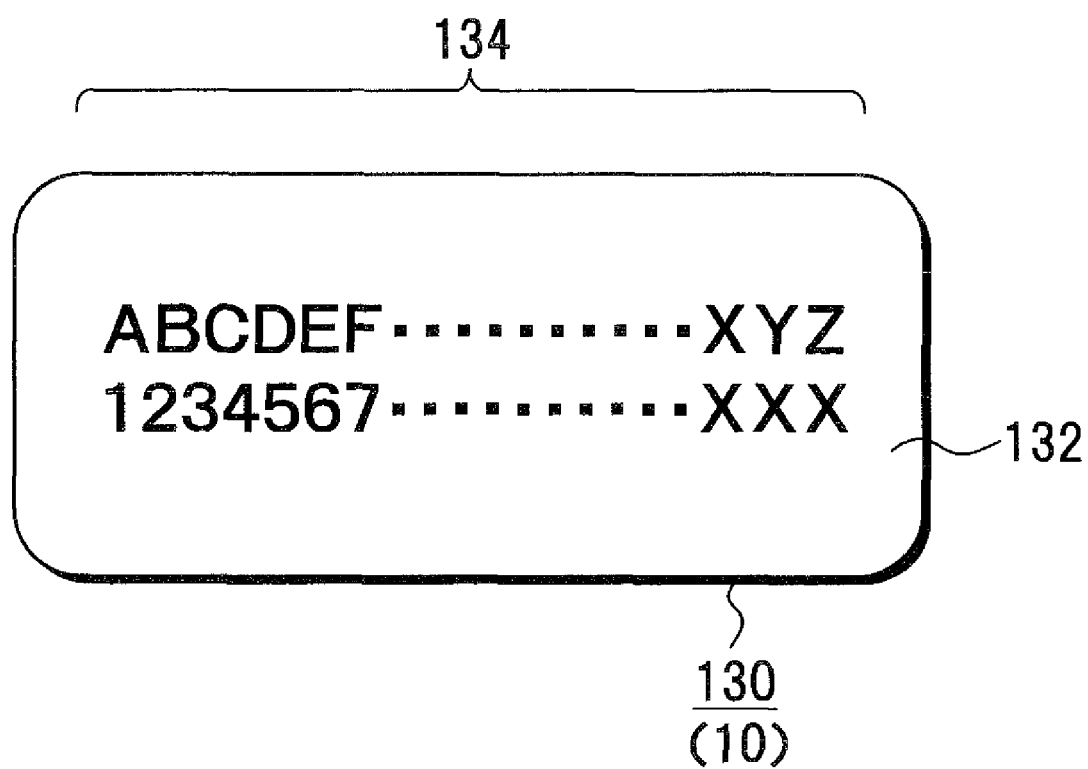
FIG. 8 is a diagram of an image recognition label (fifth embodiment).
Figure 9:
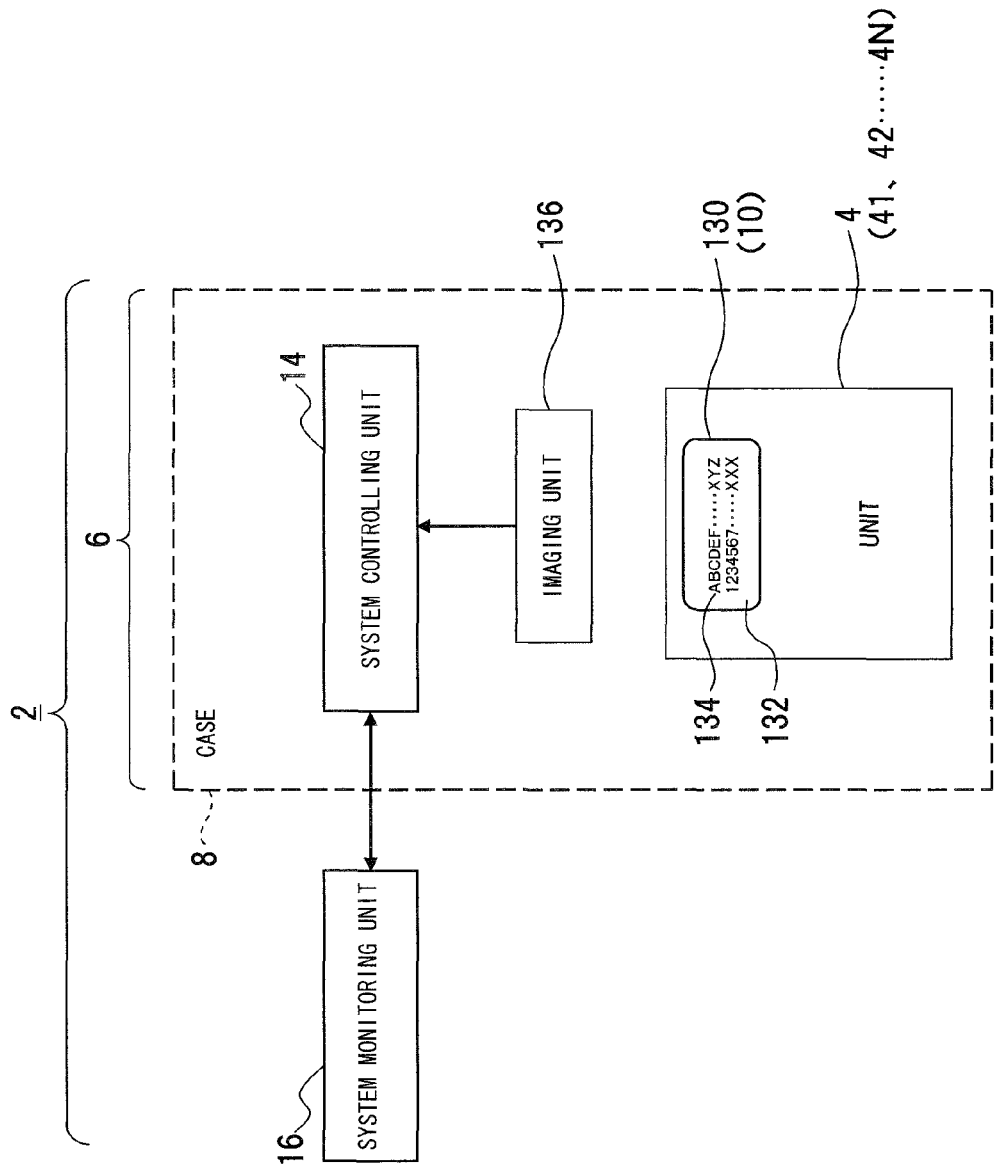
FIG. 9 is a block diagram of a configuration recognizing system using the image recognition label (fifth embodiment).

A configuration recognizing system using an image recognition label will be described with reference to FIGS. 8 and 9. FIG. 8 shows an image recognition label that is an example of the tag and FIG. 9 shows a configuration recognizing system using the image recognition label.

As shown in FIG. 8, an image recognition label 130 can be used for the above tag 10. The image recognition label 130 is a label piece 132 made of a resin sheet, paper, etc., and image recognition display 134 as identification information is formed thereon, which is characters, graphics, symbols, etc. The image recognition display 134 of this embodiment is written with numeric and alphabetical characters.

If such an image recognition label 130 is used, an imaging unit 136 is used as the non-contact recognizing unit 12 (FIG. 1) or the tag recognizing unit 120 (FIG. 2) for recognition without contact, and it enables to recognize the image recognition label 130 and its image recognition display 134 that the imaging unit 136 takes an image of the image recognition label 130. The imaging unit 136 may include a CCD (Charge Coupled Device) element, a digital camera using the device, etc. If the display information of the image recognition display 134 is read through the recognition image of the imaging unit 136 and the information is loaded into the system controlling unit 14 and recognized by, for example, the firmware 24 (FIG. 3), the configuration information such as the mounting information of the units 41, 42, 43 . . . 4N can be recognized by the image recognition display 134 to monitor the configuration information with the system monitoring unit 16, and the configuration information can be displayed on, for example, the displaying unit 20 (FIG. 2) of the PC 71, 72 . . . 7N for notification as above.

Although the CCD element and the digital camera using the device, etc. is illustrated as the imaging unit 136 in this embodiment, the imaging unit 136 may include an optical character reader (OCR) and read the displayed character information to recognize and monitor each configuration information such as the mounting information of the units 41, 42, 43 . . . 4N.

Sixth Embodiment

Figure 10:
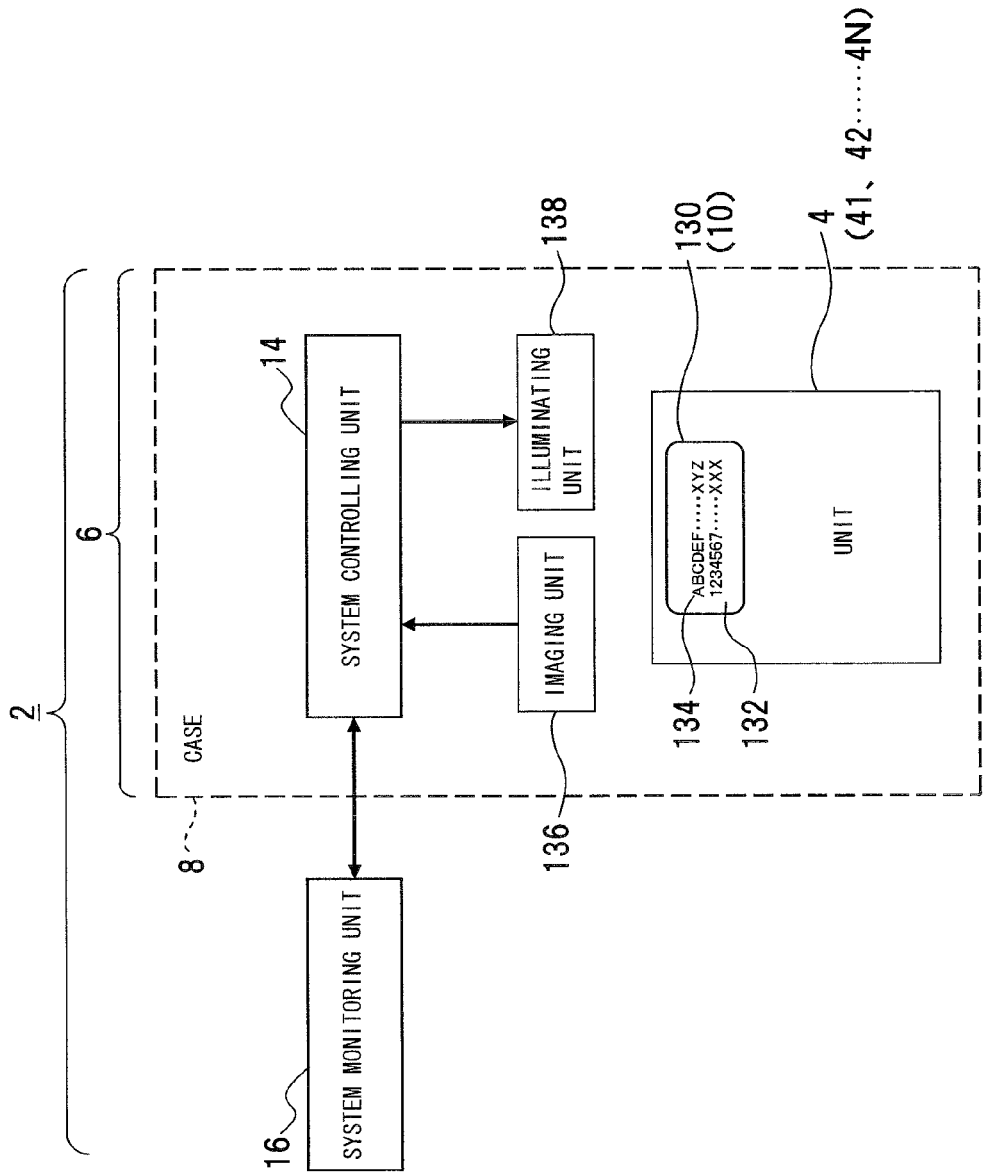
FIG. 10 is a block diagram of another configuration recognizing system using the image recognition label (sixth embodiment).

Another configuration recognition system using the image recognition label will be described with reference to FIG. 10. FIG. 10 shows a configuration recognizing system using illumination of the image recognition label at the same time.

In the configuration of recognizing the image display label of the unit 4 (41, 42, 43 . . . 4N) disposed in the case 8, an illuminating unit 138 is disposed next to the imaging unit 136, and this illuminating unit 138 includes, for example, a light emitting diode and emits light with power supply controlled by the system controlling unit 14. In this configuration, since sufficient illuminance can be achieved by the illuminating unit 138 for the image recognition display 134 of the image recognition label 130 of the unit 4 (41, 42, 43 . . . 4N) in the case 8 that blocks off outside light, the imaging unit 136 can acquire a bright image and the information recognition accuracy can be improved. In this case, if the illuminating unit 138 is operated in synchronization with the imaging timing, power-saving can be achieved and leakage of light from the case 8 can be avoided.

Seventh Embodiment

Figure 11:
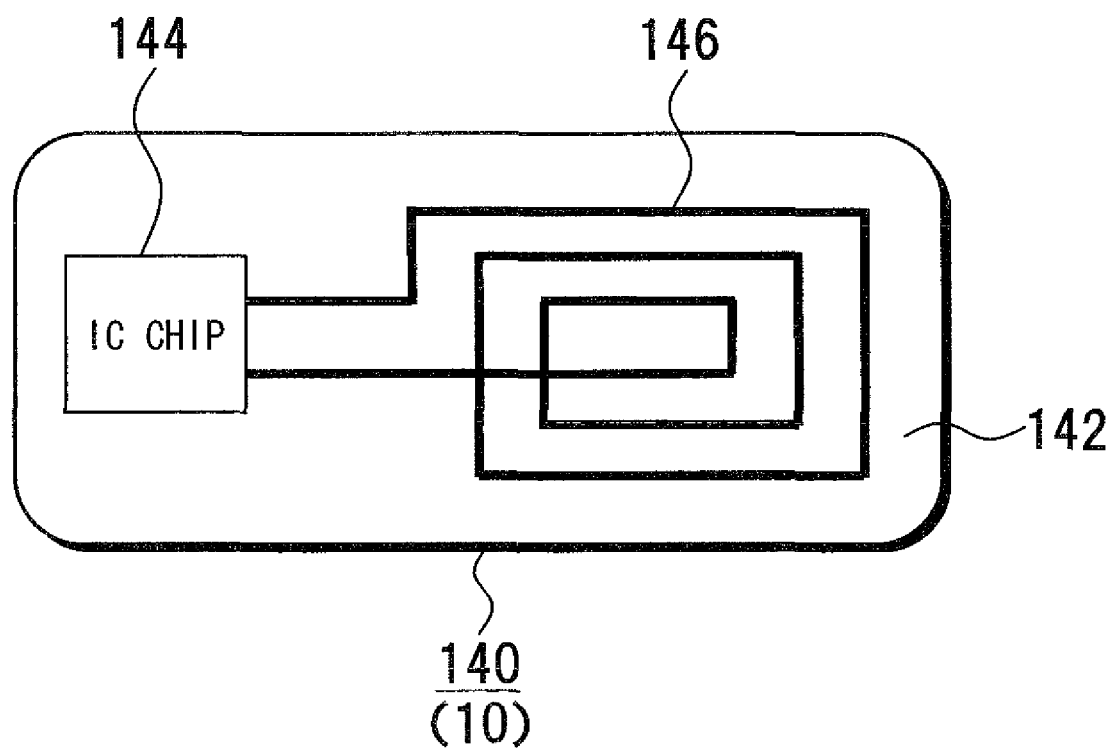
FIG. 11 is a diagram of an IC tag (seventh embodiment).
Figure 12:
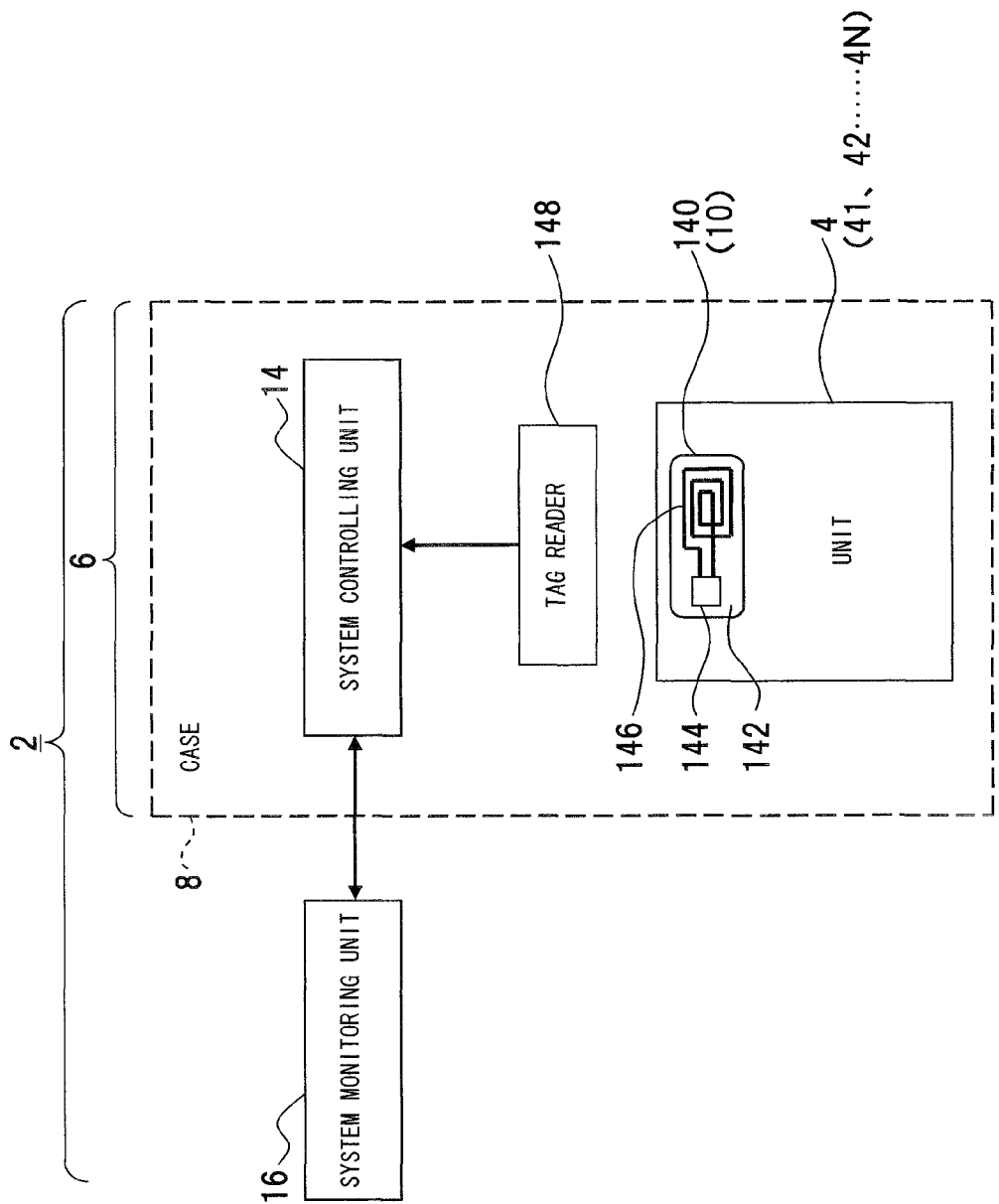
FIG. 12 is a block diagram of a configuration recognizing system using the IC tag (seventh embodiment).

A configuration recognizing system using an IC tag will be described with reference to FIGS. 11 and 12. FIG. 11 shows an IC tag that is an example of the tag and FIG. 12 shows a configuration recognizing system using the IC tag.

An IC tag 140 includes a substrate 142 made of an insulating material such as synthetic resin and this substrate 142 is disposed with an IC chip 144 and a loop-shaped antenna 146. The IC chip 144 includes a storing unit that stores the configuration information of the corresponding unit 41, 42, 43 . . . 4N and a transmitting unit that transmits the configuration information stored in the storing unit, and the configuration information output by the transmitting unit is transmitted from the antenna 146 through radio waves.

If such an IC tag 140 is used, a tag reader 148 is used as the non-contact recognizing unit 12 (FIG. 1) or the tag recognizing unit 120 (FIG. 2) for recognition without contact. The tag reader 148 includes an antenna that receives the transmission radio waves from the IC tag 140 and a detecting unit that detects the configuration information received from the transmission radio waves and is wirelessly connected to the IC tag 140.

In this configuration, the configuration information is wirelessly detected from the IC tag 140 and is input to the system controlling unit 14; the configuration information such as the mounting information of the corresponding unit 41, 42, 43 . . . 4N is recognized to monitor the configuration information with the system monitoring unit 16; and the configuration information can be displayed on the displaying unit 20 (FIG. 2) of the PC 71, 72 . . . 7N for notification in the same way.

Eighth Embodiment

Figure 13:
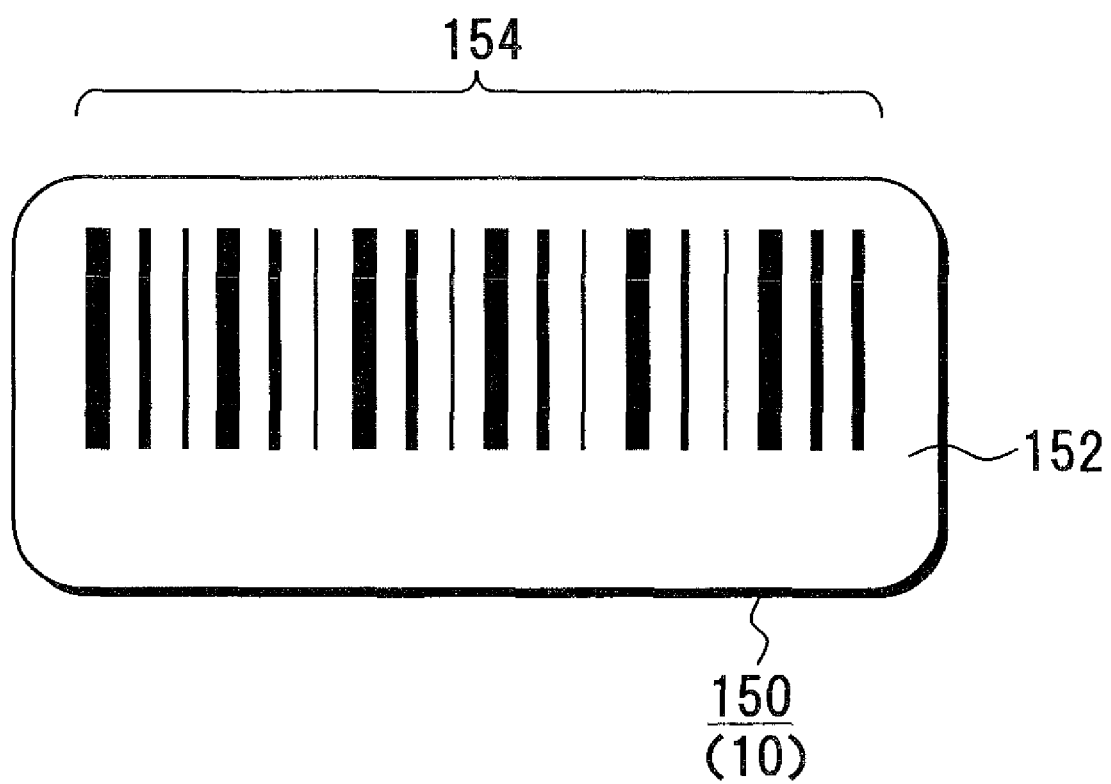
FIG. 13 is a diagram of a barcode label (eighth embodiment).
Figure 14:
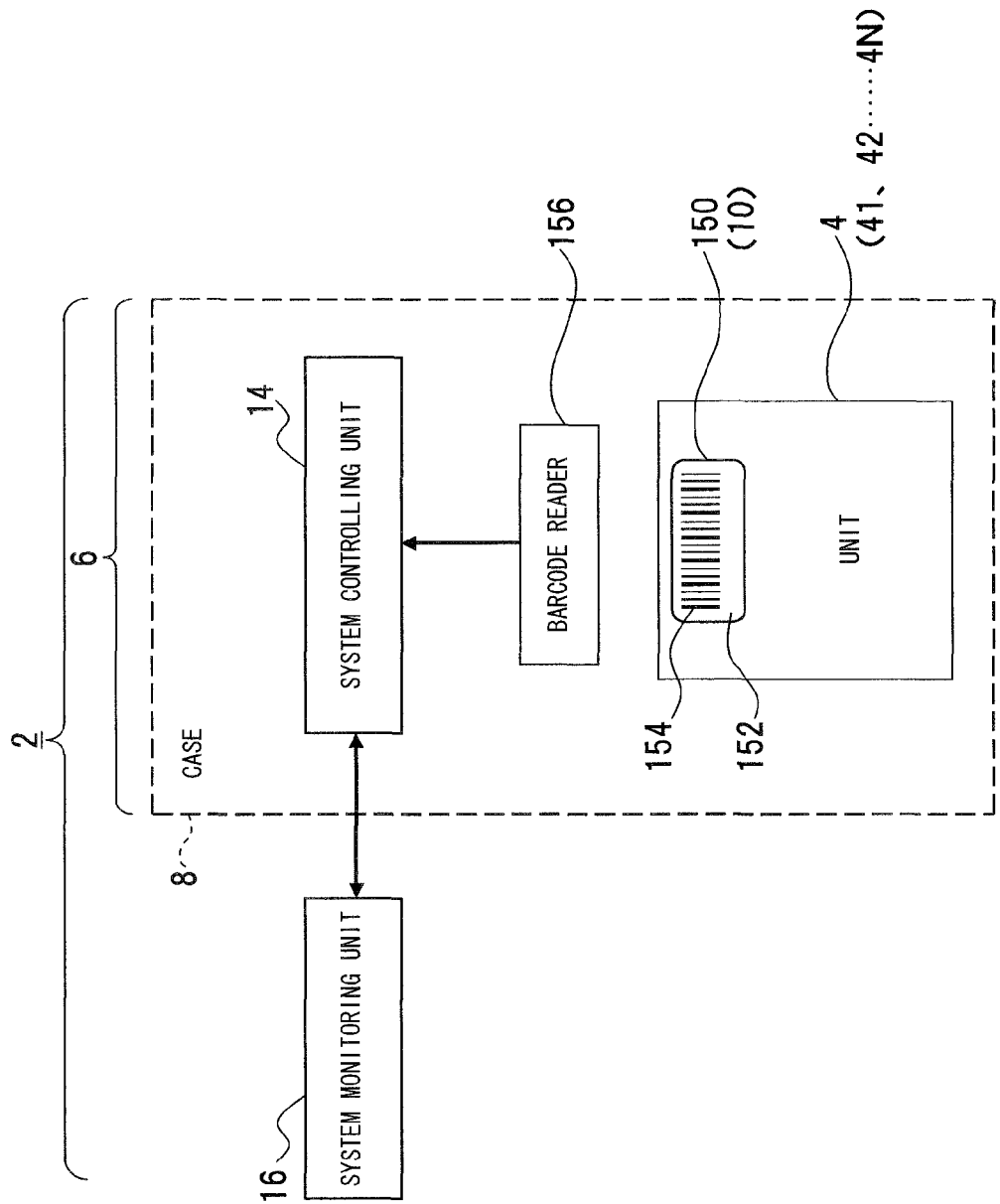
FIG. 14 is a block diagram of a configuration recognizing system using the barcode label (eighth embodiment).

A configuration recognizing system using a barcode label will be described with reference to FIGS. 13 and 14. FIG. 13 shows a barcode label that is an example of the tag and FIG. 14 shows a configuration recognizing system using the barcode label.

A barcode label 150 includes margins at right and left edge of a sheet piece 152 made of a resin sheet, paper, etc., and barcode display 154 is displayed by printing, etc. The barcode display 154 includes a state character portion, a data portion, a check digit portion, and a stop character portion, for example, and the data portion displays the configuration information such as the identification information of the corresponding unit 41, 42, 43 . . . 4N corresponding to the data portion.

If such a barcode label 150 is used, a barcode reader 156 is used as the non-contact recognizing unit 12 (FIG. 1) or the tag recognizing unit 120 (FIG. 2) for recognition without contact to recognize the barcode display 154 and read the configuration information. If the information is recognized and read by the barcode reader 156, loaded into the system controlling unit 14, and recognized by, for example, the firmware 24 (FIG. 3), the configuration information such as the mounting information of the units 41, 42, 43 . . . 4N can be recognized from the input information to monitor the configuration information with the system monitoring unit 16 in the same way, and the configuration information can be displayed on, for example, the displaying unit 20 (FIG. 2) of the PC 71, 72 . . . 7N for notification as above.

Ninth Embodiment

Figure 15:
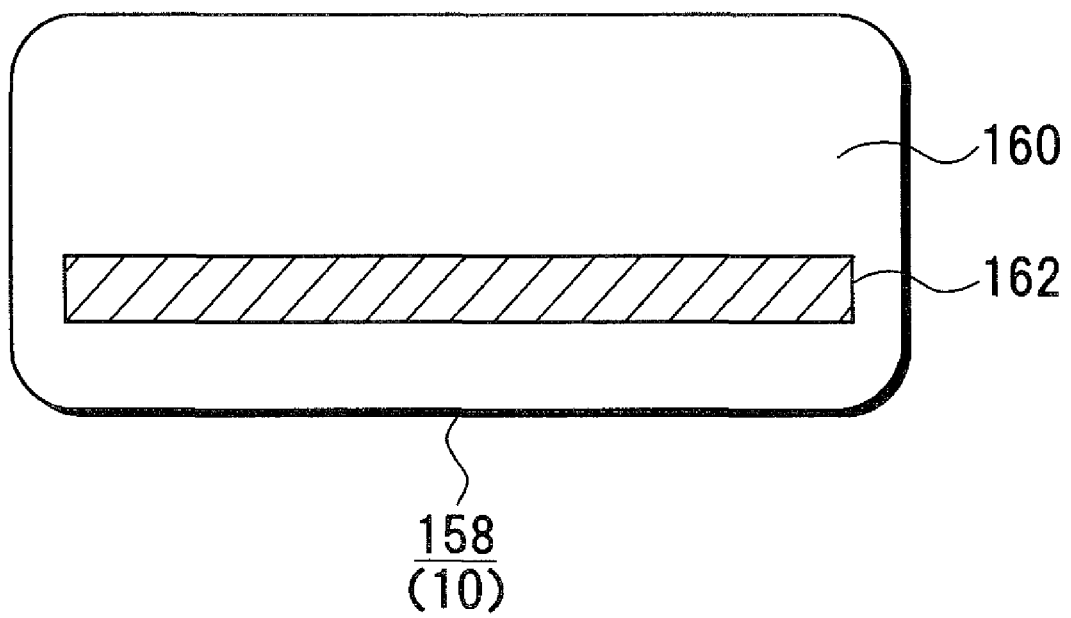
FIG. 15 is a diagram of a magnetic stripe label (ninth embodiment).
Figure 16:
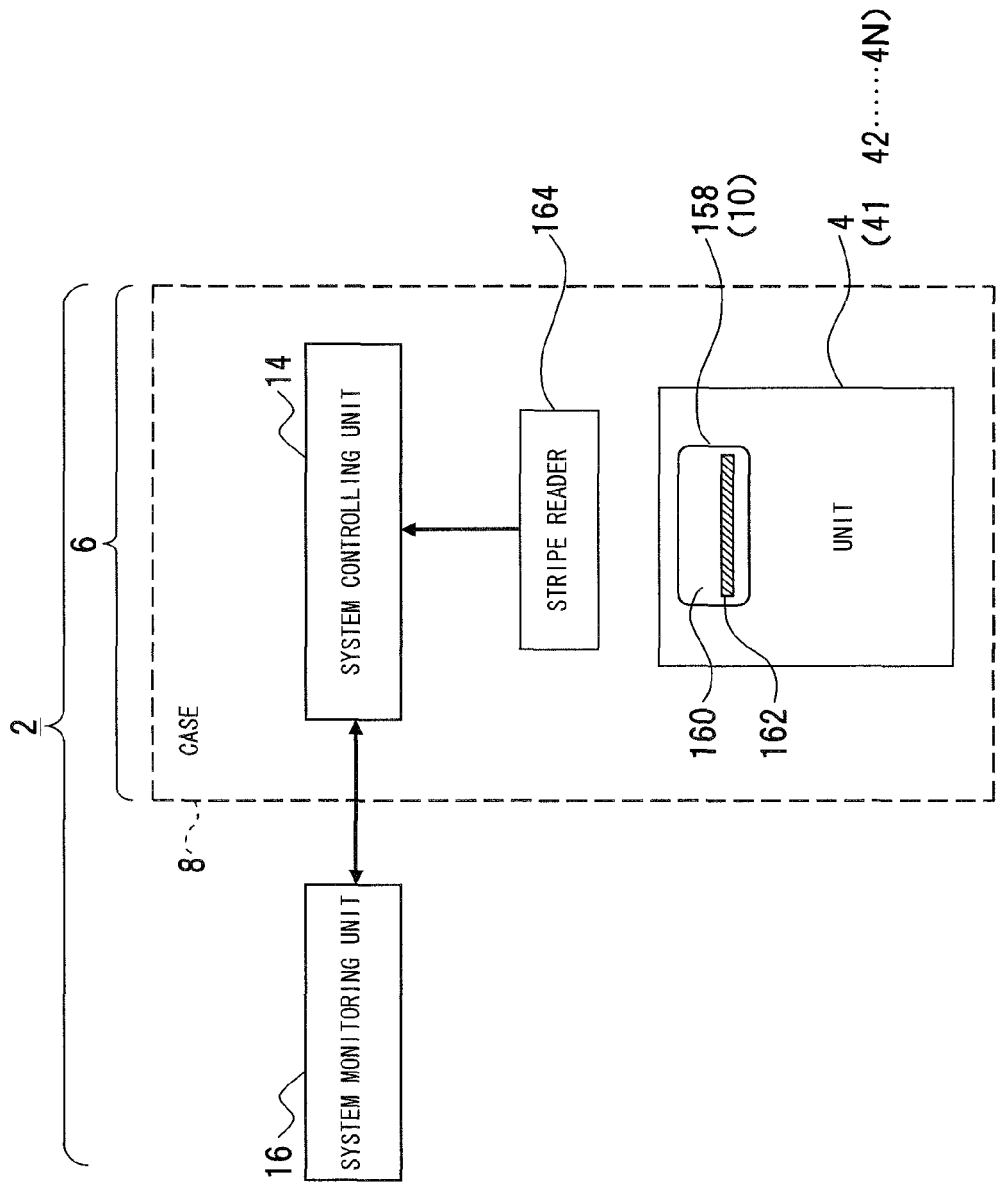
FIG. 16 is a block diagram of a configuration recognizing system using the magnetic stripe label (ninth embodiment).

A configuration recognizing system using a magnetic stripe label will be described with reference to FIGS. 15 and 16. FIG. 15 shows a magnetic stripe label that is an example of the tag and FIG. 16 shows a configuration recognizing system using the magnetic stripe label.

A magnetic stripe label 158 includes a magnetic stripe 162 disposed on a substrate 160 made of a resin sheet, paper, etc., and the magnetic stripe 162 magnetically records the configuration information such as the identification information of the corresponding unit 41, 42, 43 . . . 4N.

If such a magnetic stripe 162 is used, a stripe reader 164 is used as the non-contact recognizing unit 12 (FIG. 1) or the tag recognizing unit 120 (FIG. 2) for recognition without contact to recognize the magnetic stripe 162 and read the magnetically recorded configuration information. If the information is recognized and read by the stripe reader 164, loaded into the system controlling unit 14, and recognized by, for example, the firmware 24 (FIG. 3), the configuration information such as the mounting information of the corresponding units 41, 42, 43 . . . 4N can be recognized to monitor the configuration information with the system monitoring unit 16 in the same way, and the configuration information can be displayed on, for example, the displaying unit 20 (FIG. 2) of the PC 71, 72 . . . 7N for notification as above.

Tenth Embodiment

Figure 17:
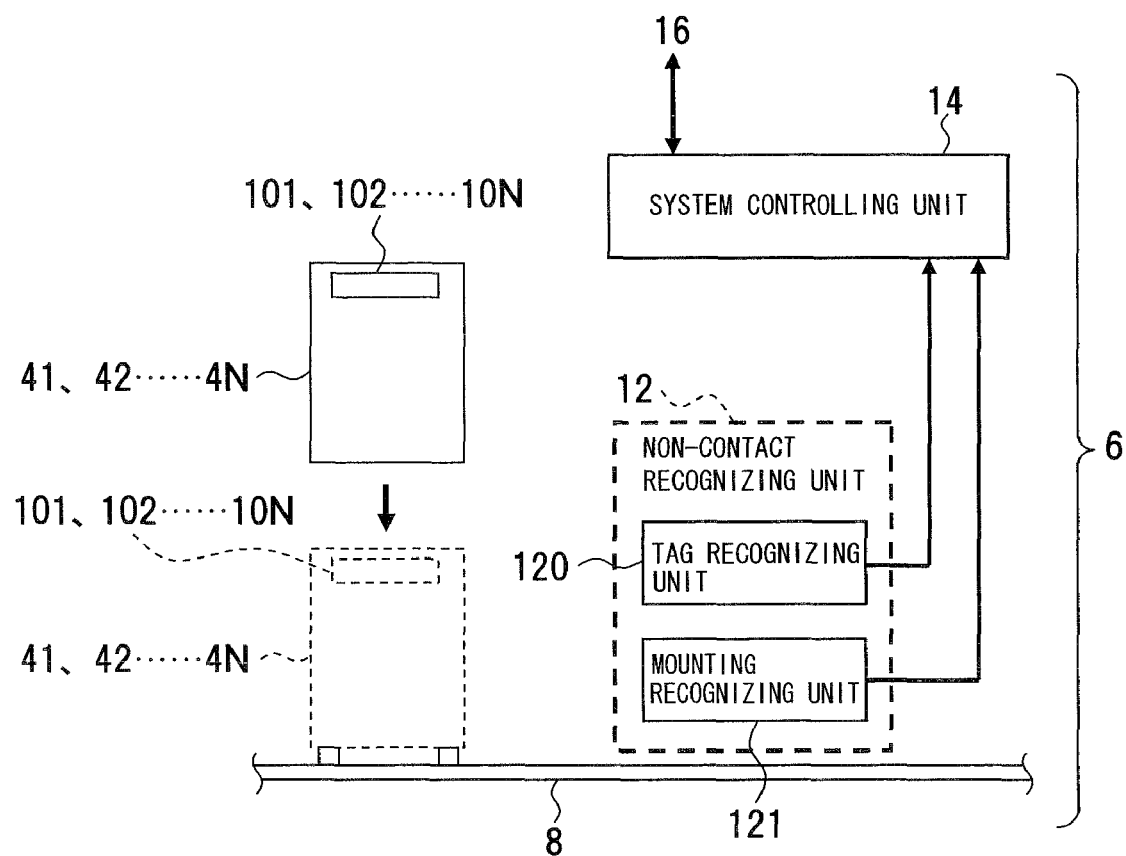
FIG. 17 is a block diagram of a configuration recognizing system that can recognize mounting of a unit (tenth embodiment).

A configuration and mounting position of the non-contact recognizing unit will be described with reference to FIG. 17. FIG. 17 shows an example of the configuration and mounting position of the non-contact recognizing unit 12.

The non-contact recognizing unit 12 of this embodiment includes the tag recognizing unit 120 that recognizes the tags 101, 102, 103 . . . 10N of the units 41, 42, 43 . . . 4N and a mounting recognizing unit 121 that recognizes the mounting of the units 41, 42, 43 . . . 4N. The tag recognizing unit 120 has the above configuration, and the mounting recognizing unit 121 is mounted, for example, in the vicinity of the joint position between the case 8 and the units 41, 42, 43 . . . 4N, recognizes that the units 41, 42, 43 . . . 4N are mounted to the case 8, and transfers the recognition information to the system controlling unit 14.

In this configuration, if the mounting recognizing unit 121 recognizes that the unit 41, 42, 43 . . . 4N is mounted to the case or is replaced, this recognition can trigger recognition of the tag 101, 102, 103 . . . 10N of the corresponding unit 41, 42, 43 . . . 4N to read the information thereof. By using the mounting information of the mounting recognizing unit 121 and the tag information from the tag recognizing unit 120, the accuracy can be improved in the recognition of the mounted or replaced units 41, 42, 43 . . . 4N and the configuration information thereof.

Eleventh Embodiment

Figure 18:
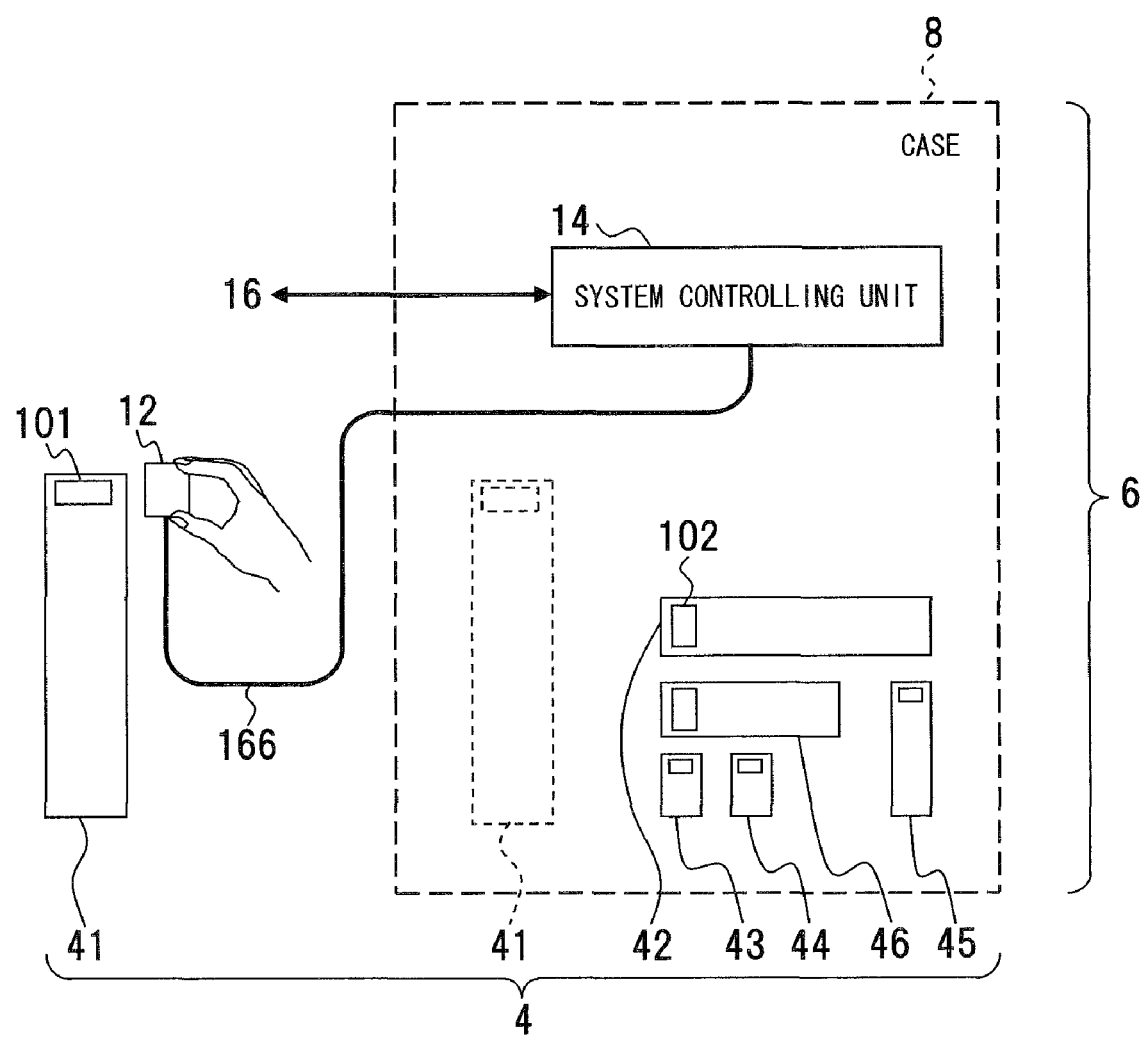
FIG. 18 is a block diagram of a configuration recognizing system that enables configuration recognition outside of a case (eleventh embodiment).

Description will be made of a non-contact recognizing unit that can be pulled out with reference to FIG. 18. FIG. 18 shows an example of the non-contact recognizing unit that can be pulled out.

The non-contact recognizing unit 12 is disposed in the case 8 and can be pulled out from the case 8 to the outside of the case 8 with a cable 166.

In this configuration, a user can pull out the non-contact recognizing unit 12 from the case 8 to allow the tag 101, 102, 103 . . . 10N disposed on the units 41, 42, 43 . . . 4N to be recognized on the outside of the case 8. The recognized configuration information is loaded into the system controlling unit 14 to perform a process for the above determination of the configuration abnormality and the determination whether the recommended configuration exists or another configuration information management. That is, manually-operated recognizing system is configured.

Twelfth Embodiment

Figure 19:
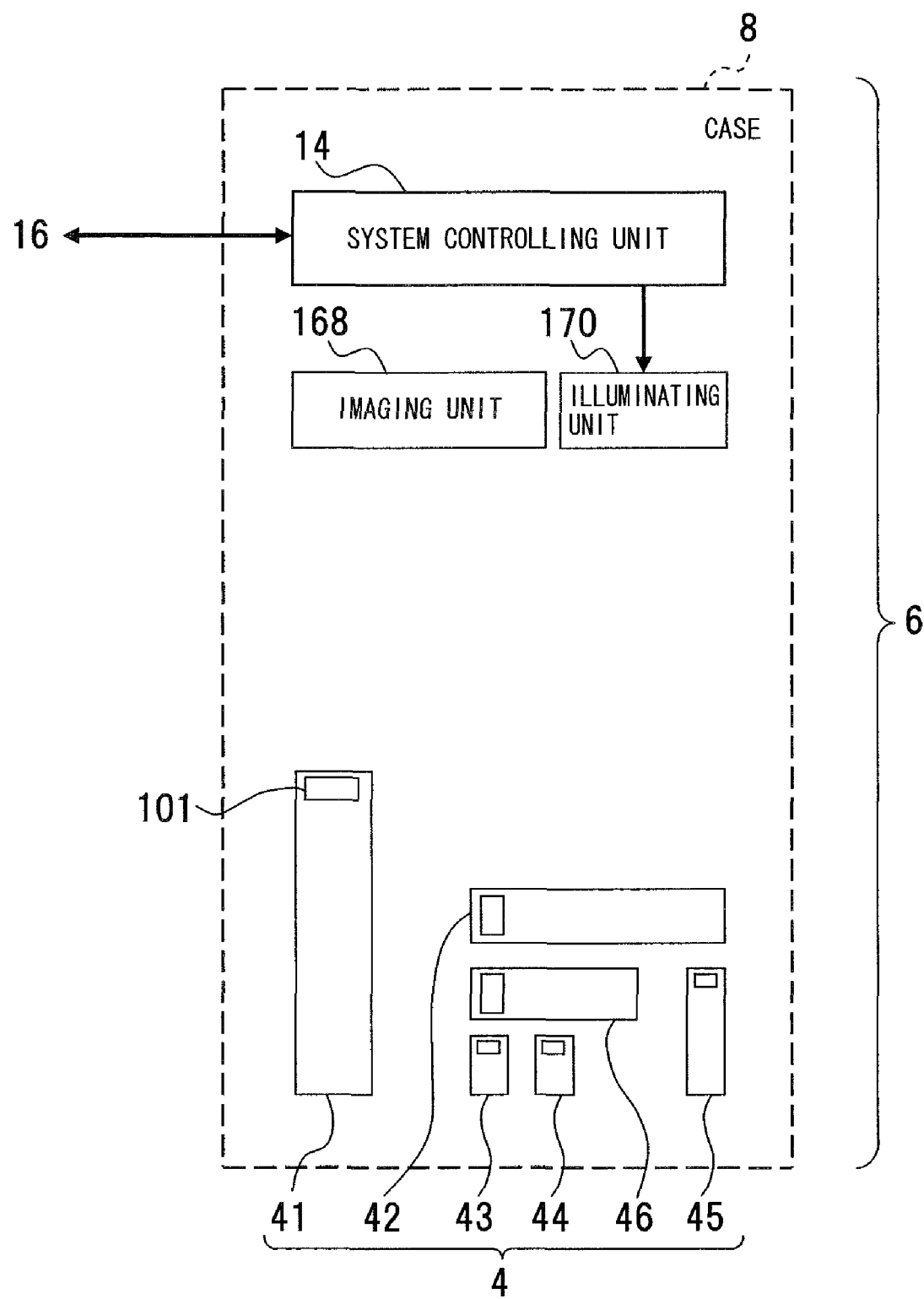
FIG. 19 is a block diagram of a configuration recognizing system that enables monitoring inside the case (twelfth embodiment).

Monitoring within the case using a configuration recognizing system will be described with reference to FIG. 19. FIG. 19 shows the configuration recognizing system used for monitoring within the case.

In this embodiment, the case 8 includes therein an imaging unit 168 that can look down and image the internal configuration. The imaging area in the case 8 may be divided into a plurality of areas and the imaging unit 168 may be disposed for each divided area. The imaging unit 168 can be the CCD element or a digital camera including the CCD element.

In this configuration, the imaging unit 168 configures an endoscope monitoring the inside of the case 8, and the system monitoring unit 16 can monitor the situation within the case 8 and the mounting situation of the units 41, 42, 43 . . . 4N through the system controlling unit 14 from the recognition information of the units 41, 42, 43 . . . 4N and the recognition and configuration information of the tags 101, 102, 103 . . . 10N obtained by the imaging unit 168 to perform the visual check of the inside of the case 8 without system down. In this case, if an illuminating unit 170 is disposed in the imaging unit 168 to emit light inside the case 8, the accuracy of the recognition image can be improved.

Thirteenth Embodiment

Figure 20:
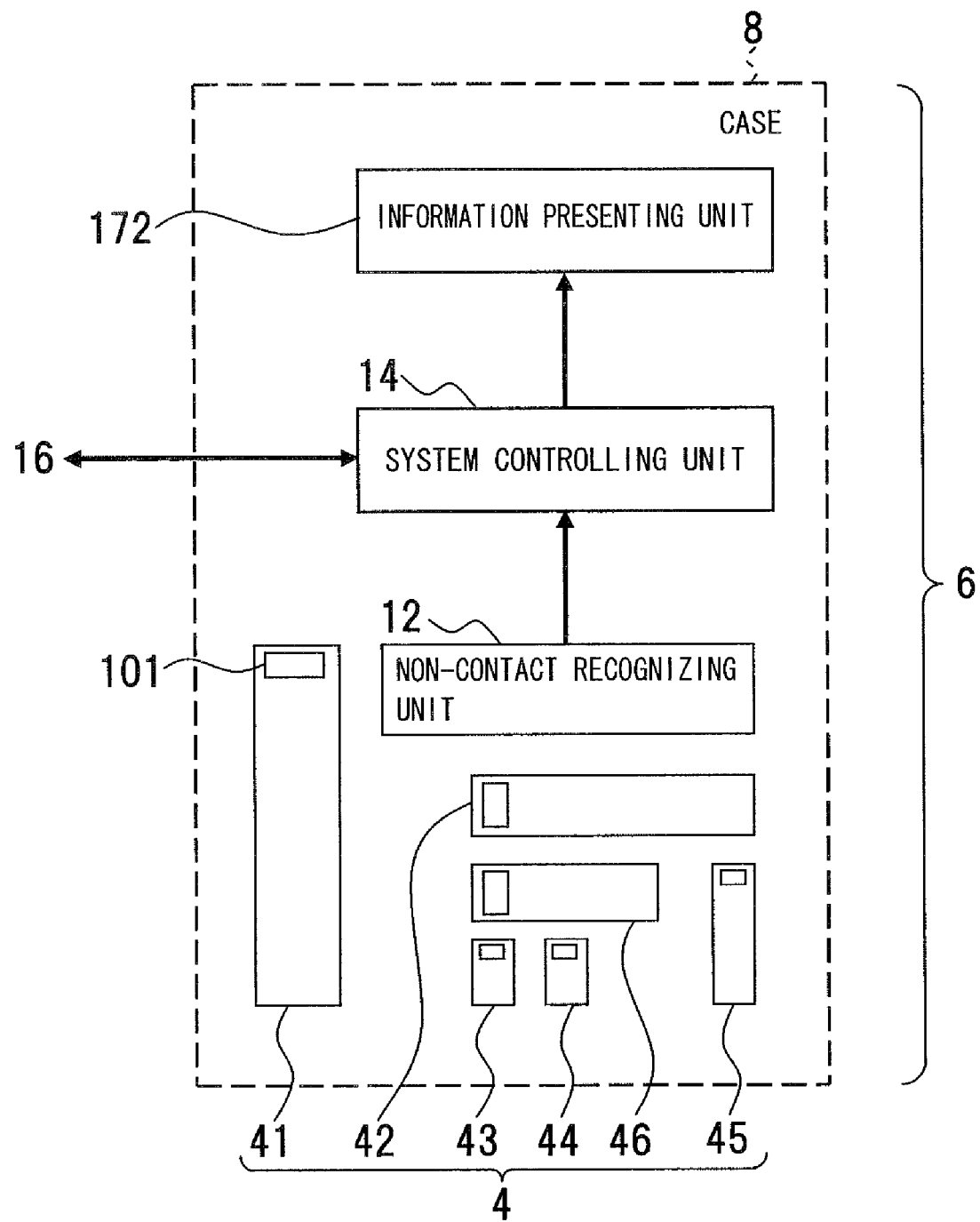
FIG. 20 is a block diagram of a configuration recognizing system that can provide information on the device side (thirteenth embodiment).

Information presentation using a configuration recognizing system will be described with reference to FIG. 20. FIG. 20 shows a configuration recognizing system including an information presenting unit in the case.

In this case, an information presenting unit 172 is included in the case 8 to present the configuration information recognized by the system controlling unit 14, the configuration information stored in the database 28 (FIG. 3), etc. In this configuration, while a remote monitoring system of the electronic device 6 is configured with the system monitoring unit 16 in the first to twelfth embodiments, since the information presenting unit 172 in the case 8 presents various pieces of information such as the configuration information, recommended configuration, and recommended position of the units 41, 42, 43 . . . 4N in this embodiment, a close monitoring system can be configured to closely check the configuration information of the units 41, 42, 43 . . . 4N in the case 8 of the electronic device 6. This contributes to simpler and quicker maintenance.

The features, advantages, and modifications of the above embodiments will be listed and described.

(1) If the device configuration recognizing system, the configuration recognizing method thereof, or the configuration recognizing program is used as described above, when a unit, i.e., a component of a server is mounted to a case of various servers such as a communication server, database server, and file server, a part attached to the unit is recognized and the configuration information displayed on the tag is read without contact on the case side and, therefore, the configuration information can easily be monitored.

(2) With regard to the mounting of the unit in the case and the acquisition of the configuration information of the unit, since the configuration information can be comprehended without the need for powering on the system board of the case, this makes the configuration information comprehended easier and is useful for improving efficiency of the maintenance work.

(3) The alteration of a substrate due to increase in the substrate information such as IDs of the units can be suppressed and contributions can be made to cost reduction. If unit IDs increase and exceed patterns preliminarily embedded in a target unit substrate, unit IDs can be added by only changing the tag, for example, by applying another barcode label and the alteration of the substrate can be suppressed to achieve cost reduction.

(4) Since unnecessary patterns are not needed to be embedded in the substrate for unit IDs, the substrate area can be utilized more usefully.

(5) Since the configuration information of the unit may be displayed on the tag rather than writing into a ROM, etc., cost reduction can be achieved.

(6) Since various configuration abnormalities can be determined and provided without waiting for the power-on of the system board, a time required for recovering from an erroneous operation can be cut remarkably.

(7) By notifying a system monitoring mechanism of configuration information of an apparatus, the burden of managing information in another system can be reduced for an administrator.

(8) After changing a configuration, the configuration information can immediately be registered in a management database and products can be managed without an error such as a missed product.

(9) Although a server apparatus has been illustrated as an example of the configuration recognizing system of a device in the above embodiments, a target for mounting the configuration recognizing system may not only be an electronic device such as an information processing apparatus but also anything such as automobiles and machine tools as long as one or a plurality of components is mounted and the target is not limited to the electronic device and the server apparatus in the embodiments.

Although the most preferred embodiments, etc., of the present invention has been described as above, the present invention is not limited to the above description; various modifications and variations can obviously be made by those skilled in the art based on the gist of the present invention described in claims or disclosed in the best modes for carrying out the invention; and it is needless to say that such modifications and variations fall within the scope of the present invention.

A configuration recognizing system, configuration recognizing method, and configuration recognizing program of a device of the present invention can comprehend configuration information of a component with a non-contact recognizing unit from a displaying unit such as a tag attached to the component without supplying power to the component mounted to the device and without contact with the component, and can usefully make maintenance management of the component easier.

What is claimed is:

1. A configuration recognizing system of a device with one or a plurality of components mounted, the system comprising:
   a displaying unit that displays configuration information representing the component mounted to the device;
   a recognizing unit that recognizes the configuration information from the displaying unit of the component mounted to the inside of a case without contact; and
   a database that stores the configuration information representing the component,
   wherein the displaying unit is a tag or a label representing the configuration information of the component, and
   the recognizing unit recognizes configuration information on the tag or the label, and the recognized configuration information is registered into the database to be managed.

2. The configuration recognizing system of the device of claim 1, further comprising a controlling unit that uses the configuration information recognized by the recognizing unit to determine whether the component is normal, the controlling unit outputting the determination information.

3. The configuration recognizing system of the device of claim 1, further comprising a monitoring unit that monitors the component based on the configuration information recognized by the recognizing unit.

4. The configuration recognizing system of the device of claim 1, wherein the configuration information includes identification information of the component, content information of the component, and mounting information of the component for the device.

5. The configuration recognizing system of the device of claim 1, wherein the recognizing unit is an imaging unit that reads identification information formed on the displaying unit.

6. A configuration recognizing system of a device with one or a plurality of components mounted, the system comprising:
   a displaying unit that displays configuration information representing the component mounted to the device;
   a recognizing unit that recognizes the configuration information from the displaying unit of the component mounted to the inside of a case without contact; and
   a controlling unit that determines whether another recommended component exists from the configuration information recognized by the recognizing unit, the controlling unit outputting the determination information,
   wherein the displaying unit is a tag or a label representing the configuration information of the component, and
   the recognizing unit recognizes configuration information on the tag or the label.

7. A configuration recognizing system of a device with one or a plurality of components mounted, the system comprising:
   a displaying unit that displays configuration information representing the component mounted to the device; and
   a recognizing unit that recognizes the configuration information from the displaying unit of the component mounted to the inside of a case without contact,
   wherein the displaying unit displaying the configuration information is an image recognition label, IC tag, barcode label, magnetic stripe label, or any combination thereof.

8. The configuration recognizing system of the device of claim 7, wherein the displaying unit includes an IC tag that transmits the configuration information and wherein the recognizing unit is a tag reader that recognizes the configuration information from the IC tag.

9. The configuration recognizing system of the device of claim 7, wherein the displaying unit includes a barcode that displays the configuration information and wherein the recognizing unit is a barcode reader that recognizes the barcode to read the configuration information.

10. The configuration recognizing system of the device of claim 7, wherein the displaying unit includes a magnetic stripe that magnetically records the configuration information and wherein the recognizing unit is a stripe reader that recognizes the magnetic stripe to read the configuration information.

11. A configuration recognizing method of a device with one or a plurality of components mounted, the method comprising:
   recognizing a displaying unit that displays configuration information of the component to read the configuration information without contact;
   determining whether the configuration information recognized from the displaying unit of the component is normal; and
   making a database of the configuration information recognized from the displaying unit,
   wherein the displaying unit is a tag or a label representing the configuration information of the component, and
   wherein the configuration information is recognized from the tag or the label, and is registered into the database to be managed.

12. A configuration recognizing method of a device with one or a plurality of components mounted, the method comprising:
   recognizing a displaying unit that displays configuration information of the component to read the configuration information without contact; and
   determining whether another recommended component exists from the configuration information recognized from the displaying unit of the component,
   wherein the displaying unit is a tag or a label representing the configuration information of the component, and
   wherein the configuration information is recognized from the tag or the label.

13. A non transitory computer readable medium storing a configuration recognizing program of a device with one or a plurality of components mounted, the program allowing a computer mounted to the device to perform a process including:

recognizing a displaying unit that displays configuration information of the component to read the configuration information without contact;

determining whether the configuration information recognized from the displaying unit of the component is normal; and making a database of the configuration information read from the displaying unit, wherein the displaying unit is a tag or a label representing the configuration information of the component, and wherein the configuration information is recognized from the tag or the label, and is registered into the database to be managed.

14. A non transitory computer readable medium storing a configuration recognizing program of a device with one or a plurality of components mounted, the program allowing a computer mounted to the device to perform a process including:

recognizing a displaying unit that displays configuration information of the component to read the configuration information without contact;

determining whether the configuration information recognized from the displaying unit of the component is normal; and determining whether another recommended component exists from the configuration information recognized from the displaying unit of the component, wherein the displaying unit is a tag or a label representing the configuration information of the component, and wherein the configuration information is recognized from the tag or the label.

15. A configuration recognizing method of a device with one or a plurality of components mounted, the method comprising:

recognizing a displaying unit that displays configuration information of the component to read the configuration information without contact; and determining whether the configuration information recognized from the displaying unit of the component is normal, wherein the displaying unit is an image recognition label, IC tag, barcode label, magnetic stripe label, or any combination thereof.

16. A non transitory computer readable medium storing a configuration recognizing program of a device with one or a plurality of components mounted, the program allowing a computer mounted to the device to perform a process including:

recognizing a displaying unit that displays configuration information of the component to read the configuration information without contact; and determining whether the configuration information recognized from the displaying unit of the component is normal, wherein the displaying unit is an image recognition label, IC tag, barcode label, magnetic stripe label, or any combination thereof.

\* \* \* \* \*